(12) United States Patent
Kim

(10) Patent No.: US 9,332,249 B2
(45) Date of Patent: May 3, 2016

(54) MOBILE TERMINAL

(75) Inventor: Hakhae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 464 days.

(21) Appl. No.: 13/560,922

(22) Filed: Jul. 27, 2012

(65) Prior Publication Data

US 2013/0069938 A1    Mar. 21, 2013

(30) Foreign Application Priority Data

Sep. 19, 2011 (KR) .................... 10-2011-0093849

(51) Int. Cl.
*G06T 15/04* (2011.01)
*H04N 13/04* (2006.01)
*H04N 13/00* (2006.01)
*H04N 13/02* (2006.01)

(52) U.S. Cl.
CPC ......... *H04N 13/0404* (2013.01); *H04N 13/004* (2013.01); *H04N 13/0447* (2013.01); *H04N 13/0232* (2013.01); *H04N 2013/0461* (2013.01)

(58) Field of Classification Search
USPC ........................................................ 345/419
See application file for complete search history.

(56) References Cited

U.S. PATENT DOCUMENTS

| | | | |
|---|---|---|---|
| 2004/0001139 A1* | 1/2004 | Kobayashi | 348/59 |
| 2007/0063941 A1* | 3/2007 | Tanaka | 345/87 |
| 2007/0216596 A1* | 9/2007 | Lewis et al. | 343/848 |
| 2007/0291172 A1* | 12/2007 | Kouzimoto et al. | 348/488 |
| 2008/0079660 A1* | 4/2008 | Fukushima et al. | 345/7 |
| 2008/0316597 A1* | 12/2008 | Tsai et al. | 359/465 |
| 2010/0086285 A1* | 4/2010 | Sasaki et al. | 386/108 |
| 2010/0201790 A1* | 8/2010 | Son et al. | 348/53 |
| 2010/0245369 A1* | 9/2010 | Yoshino | 345/522 |
| 2010/0263946 A1* | 10/2010 | Miyazaki | 178/2 R |
| 2010/0275238 A1* | 10/2010 | Nagasawa et al. | 725/116 |
| 2010/0293502 A1* | 11/2010 | Kang et al. | 715/803 |
| 2011/0246877 A1* | 10/2011 | Kwak et al. | 715/702 |
| 2012/0056830 A1* | 3/2012 | Suzuki et al. | 345/173 |
| 2014/0055692 A1* | 2/2014 | Kroll et al. | 349/15 |

FOREIGN PATENT DOCUMENTS

| | | |
|---|---|---|
| JP | 2011-100337 | 5/2011 |
| KR | 10-2000-0068579 | 11/2000 |
| KR | 10-2011-0053660 | 5/2011 |
| KR | 10-1055608 | 8/2011 |

* cited by examiner

*Primary Examiner* — Kimbinh T Nguyen
(74) *Attorney, Agent, or Firm* — Lee, Hong, Degerman, Kang & Waimey; Jonathan Kang; Harry Lee

(57) ABSTRACT

A mobile terminal is disclosed, which enables a user to change and view a 2D image and/or a 3D image on a display unit by changing a view angle without manipulation of an input unit. The present invention includes a display panel configured to display a plurality of output images, a multi-view angle panel provided in front of the display panel to provide a user with a prescribed one of a plurality of the output images in accordance with a plurality of preset view angles, and a controller partitioning the display panel into a plurality of display regions, the controller partitioning a plurality of the output images into a plurality of partitioned images to correspond to the number of a plurality of the display regions, the controller controlling the display panel to display a plurality of the partitioned images on a plurality of the display regions.

15 Claims, 28 Drawing Sheets

MOBILE TERMINAL

Pursuant to 35 U.S.C. §119(a), this application claims the benefit of earlier filing date and right of priority to Korean Application No. 10-2011-0093849, filed on Sep. 19, 2011, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for a user to change and view a 2D (2-dimensional) image and/or a stereoscopic image on a display unit by changing a view angle without manipulation of an input unit.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Specifically, as an image display device tends to adopt a display for viewing a 2D image and/or a 3D (3-dimensional) image (or a stereoscopic image), it is expected that a mobile terminal will adopt a 2D image and/or a 3D image display to cope with such a tendency.

However, since a single 2D image and/or a single 3D image is displayed on a display of a mobile terminal according to a related art, if a user attempts to view another 2D image and/or another 3D image, the user may have to change a screen by manipulating a separate input unit. For instance, if a user attempts to watch a sports game in the course of watching a movie on a display of a mobile terminal, the user ends a movie play application by manipulating an input unit and then activates a sports broadcast application by manipulating the input unit. Thus, it is inconvenient for the user to manipulate the input unit multiple times.

SUMMARY OF THE INVENTION

Accordingly, the present invention is directed to a mobile terminal that substantially obviates one or more problems due to limitations and disadvantages of the related art.

An object of the present invention is to provide a mobile terminal, by which a user is enabled to change and watch a 2D image and/or a 3D image on a display unit without manipulating an input unit separately.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display panel configured to display a plurality of output images, a multi-view angle panel provided in front of the display panel to provide a user with a prescribed one of a plurality of the output images in accordance with a plurality of preset view angles, and a controller controlling the display panel and the output image, wherein the controller partitioning the display panel into a plurality of display regions, and partitioning a plurality of the output images into a plurality of partitioned images to correspond to the number of a plurality of the display regions, and wherein the controller controlling the display panel to display a plurality of the partitioned images on a plurality of the display regions.

In another aspect of the present invention, a mobile terminal according to the present invention includes a display panel configured to display an output image, a view angle sensing unit configured to sense a user's view angle, and a controller controlling the display panel and the output image, wherein the controller calculates an input view angle corresponding to the user's view angle sensed by the view angle sensing unit and wherein the controller displays the output image corresponding to the input view angle on the display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
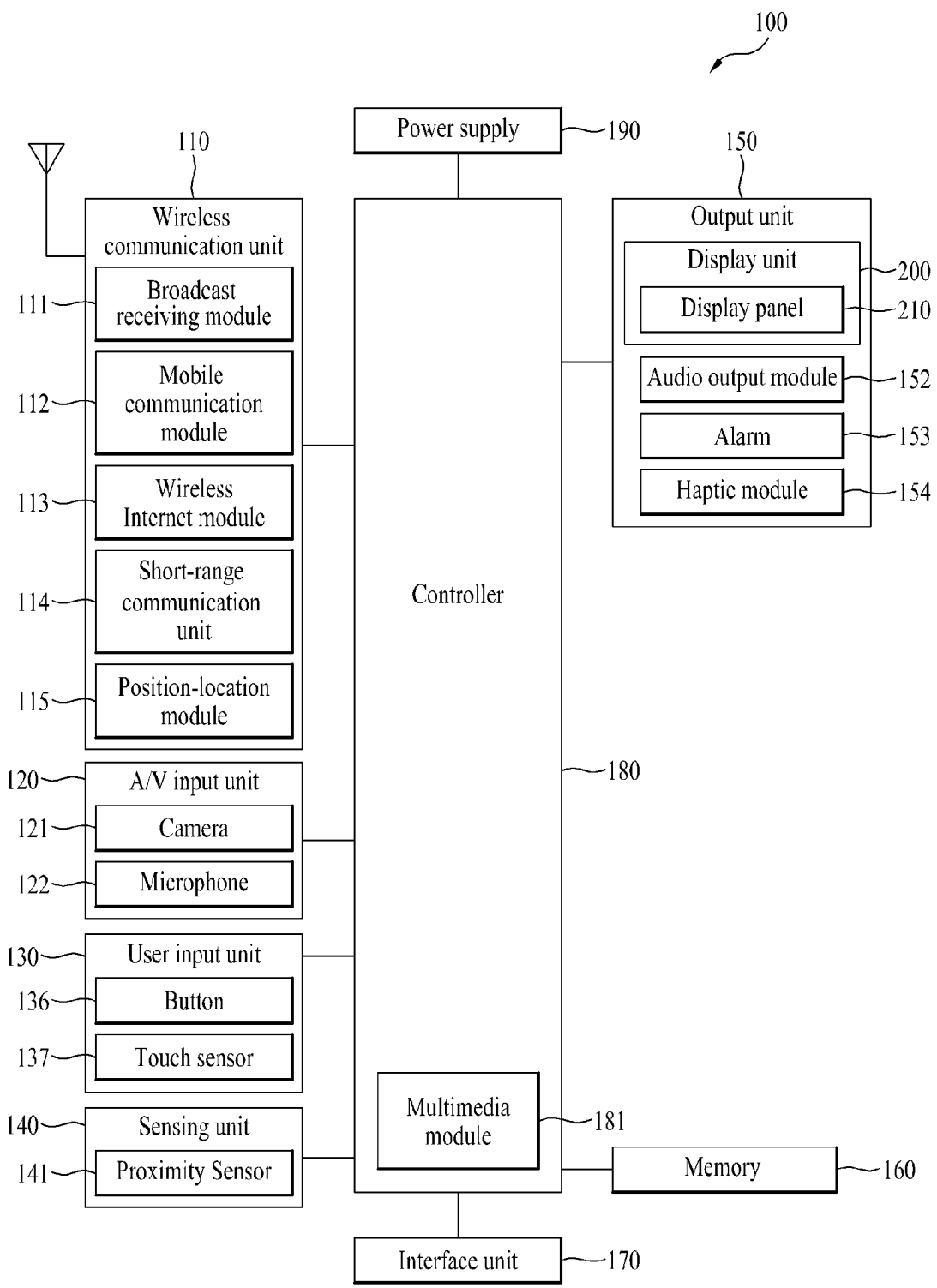
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, and a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By no limiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (Media FLOC)) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM(Global System for Mobile communications), CDMA(Code Division Multiple Access), WCDMA (Wideband CDMA) and so on. Such wireless signals may represent audio, video, and data according to text/multimedia message transmitting and receiving, among others.

The wireless internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA(High Speed Downlink Packet Access), GSM, CDMA, WCDMA, LTE (Long Term Evolution) etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (AN) input unit 120 is configured to provide audio or video signal input to the mobile terminal 100. As shown, the NV input unit 120 includes a camera 121 and a microphone 122. The camera 121 receives and processes image frames of still pictures or video, which are obtained by an image sensor in a video call mode or a photographing mode. And, the processed image frames can be displayed on the display 200.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

Moreover, the sensing unit 140 may further include a gyro sensor 143 provided within a body of the mobile terminal. In particular, when the mobile terminal is moved, the gyro sensor 143 measures a speed and acceleration of the mobile terminal. When the mobile terminal is inclined, the gyro sensor 143 is able to measure an inclination of the mobile terminal.

The output unit 150 generates outputs relevant to the senses of sight, hearing, touch and the like. And, the output unit 150 includes the display 200, an audio output module 152, an alarm unit 153, and a haptic module 154 and the like.

The display 200 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 200 may additionally or alternatively display images which are associated with these modes, the UI or the GUI.

The display module 200 may be implemented using known display technologies including, for example, a liquid crystal display (LCD), a thin film transistor-liquid crystal display (TFT-LCD), an organic light emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 200 can be implemented in the optical transmittive type as well. In this configuration, a user is able to see an object in rear of a terminal body via the area occupied by the display 200 of the terminal body.

At least two displays 200 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 200 and a sensor for detecting a touch action (hereinafter called 'touch sensor') configures a mutual layer structure (hereinafter called 'touch screen'), it is able to use the display 200 as an input device as well as an output device. In this case, the touch sensor can be configured as a touch film, a touch sheet, a touchpad or the like.

The touch sensor can be configured to convert a pressure applied to a specific portion of the display 200 or a variation of a capacitance generated from a specific portion of the display 200 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 200 is touched.

Referring to FIG. 1, a proximity sensor 141 can be provided to an internal area of the mobile terminal 100 enclosed by the touch screen or around the touch screen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touch screen includes the electrostatic capacity proximity sensor, it is configured to detect the proximity of a pointer using a variation of electric field according to the proximity of the pointer. In this case, the touch screen (touch sensor) can be classified as the proximity sensor.

For clarity and convenience of the following description, as a pointer becomes proximate to a touch screen without coming into contact with the touch screen, if the pointer is perceived as situated over the touch screen, such an action shall be named 'proximity touch'. If a pointer actually comes into contact with a touch screen, such an action shall be named 'contact touch'. A proximity-touched position over the touch screen with the pointer may mean a position at which the pointer vertically opposes the touch screen when the touch screen is proximity-touched with the pointer.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touch screen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 200 or the audio output unit 152. Hence, the display 200 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touch screen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touch screen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
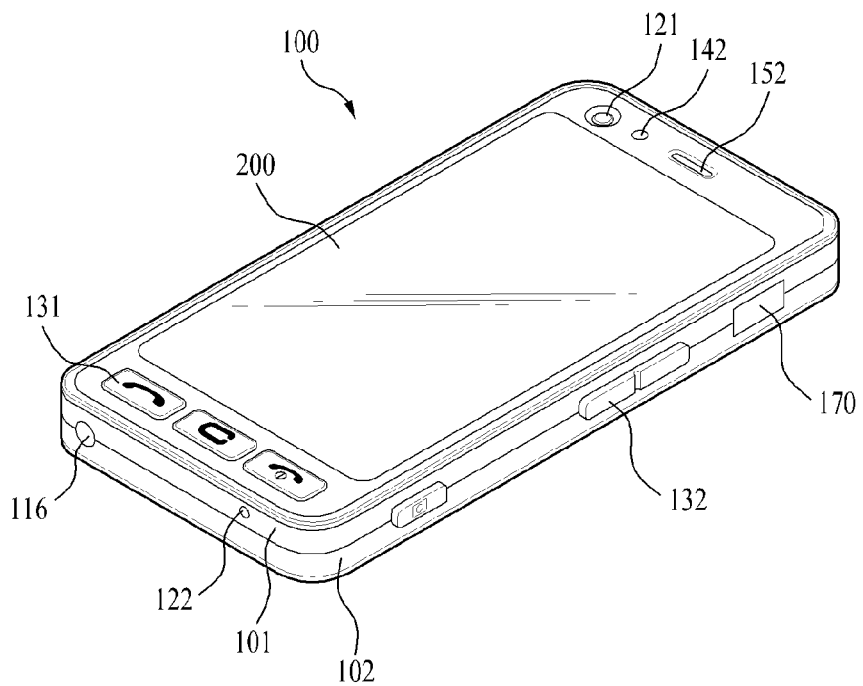
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 200, an audio output unit 152, a camera 121, user input units 130/131 and 132, a microphone 122, an interface 180 and the like can be provided to the terminal body, and more particularly, to the front case 101.

The display 200 occupies most of a main face of the front case 101. The audio output unit 152 and the camera 121 are provided to an area adjacent to one of both end portions of the display 200, while the user input unit 131 and the microphone 122 are provided to another area adjacent to the other end portion of the display 200. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 200 or the like can be inputted to the second manipulating unit 132.

Figure 2B:
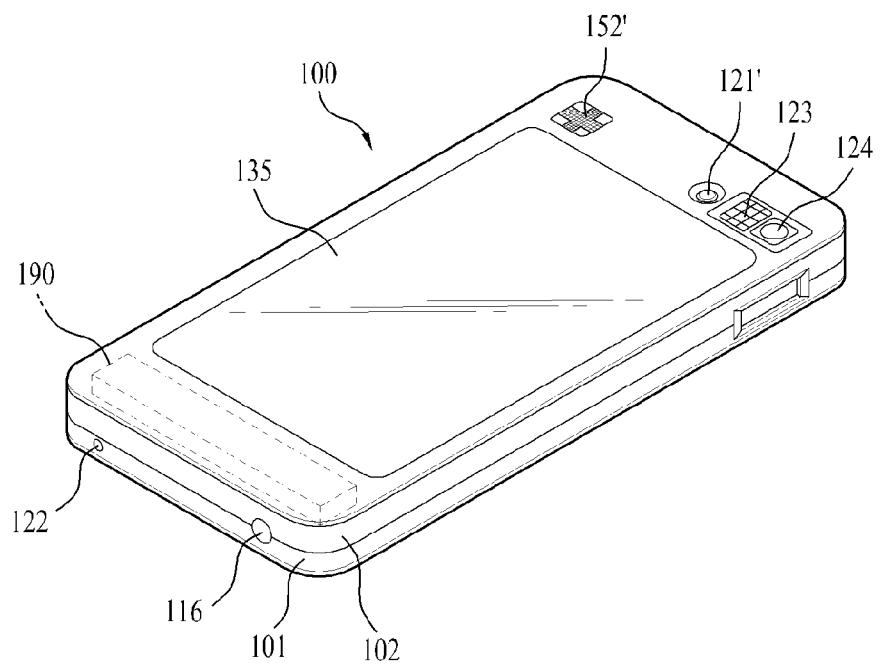
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 200. In this case, if the display 200 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touch screen can be provided to the rear case 102 as well.

The touchpad 135 is activated by interconnecting with the display 200 of the front case 101. The touchpad 135 can be provided in rear of the display 200 in parallel. The touchpad 135 can have a size equal to or smaller than that of the display 200.

Figure 3:
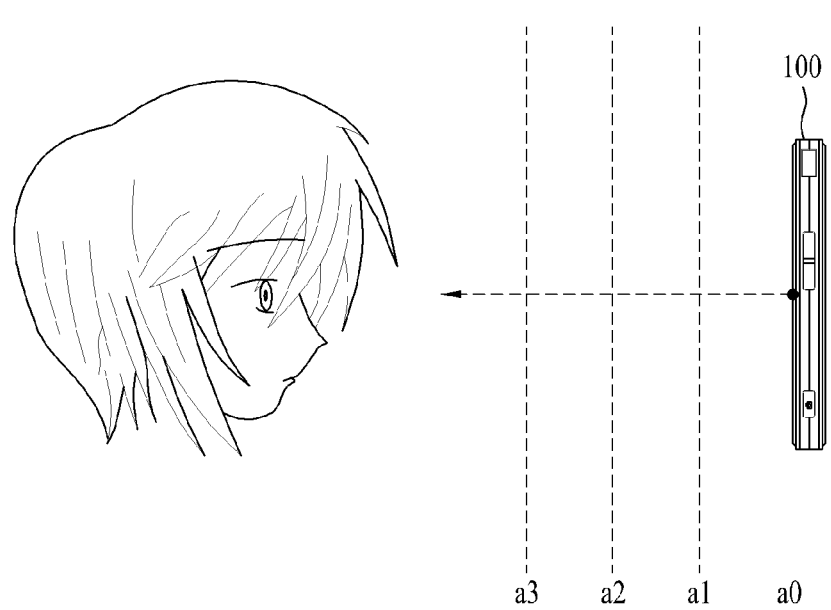
FIG. 3 is a diagram for the concept of a proximity sensor.

FIG. 3 is a diagram for the concept of a proximity sensor 141.

Referring to FIG. 3, if such a pointer as a viewer's face is proximate to the touch screen, the proximity sensor 141 provided within or in the vicinity of the touch screen detects the pointer and then outputs a proximity signal.

The proximity sensor 141 may be configured to output a proximity signal differing in accordance with a distance (hereinafter named 'proximity distance') between the pointer proximate thereto and the display unit 200.

FIG. 3 shows an example of a cross-section of the display unit 200 provided with the proximity sensor 141 capable of detecting three proximity depths. Optionally, the proximity sensor 141 may be able to detect at least 4 proximity depths.

In particular, when the pointer completely comes into contact with the display unit 200 [a0], a viewer is recognized as coming into contact with the display unit 200. When the pointer is located by being spaced apart from the display unit 200 in a distance smaller than a distance al, a viewer is recognized as located in the distance al from the display unit 200. When the pointer is located by being spaced apart from the display unit 200 in a distance between the distance al and a distance a2, a viewer is recognized as located in the distance a2 from the display unit 200. When the pointer is located by being spaced apart from the display unit 200 in a distance between the distance a2 and a distance a3, a viewer is recognized as located in the distance a3 from the display unit 200, which will be described later. When the pointer is located by being spaced apart from the display unit 200 over the distance a3, the proximity sensor 141 is recognized as deactivated.

Hence, the controller 180 receives various input signals to recognize how far the user is spaced apart from the display unit 200 (or a video panel 155 described later) in accordance with a proximity depth of the pointer, a proximity position of the pointer and the like. The controller 180 may be then able to perform various operations control in accordance with the various input signals.

The sensing unit 140 may include a distance sensor 142 (not shown in FIG. 1). The distance sensor 142 may be situated on a surface of the mobile terminal 100 or within the mobile terminal 100. The distance sensor 142 is a device for measuring a distance (D) from an object (e.g., a viewer) situated in front. For instance, a distance may be calculated in a manner of measuring a time difference taken for an ultrasonic wave to return to its start point by being reflected by a measurement target object. Alternatively, infrared or laser may be usable for this calculation.

The sensing unit 140 may include the camera 121 of the A/V input unit 120. Preferably, the camera 121 may include a VT (video telecommunication) camera.

In this case, the camera 121 is used as an eye detection device in conjunction with the controller that will be described later. To this end, after the camera 121 has captured a face image of a viewer, the controller 180 detects positions of both eyes of the viewer in a manner of extracting all boundaries attributed to a contrast difference from the captured face image and then analyzing a considerable contrast difference between an ocular conjunctiva and a pupil using histogram and the like. A user's view angle may be measured from positions of both eyes detected via the camera 121. A user's view angle for the display unit 200 is calculated from the distance between a pair of user eyes by the controller 180.

Figure 4:
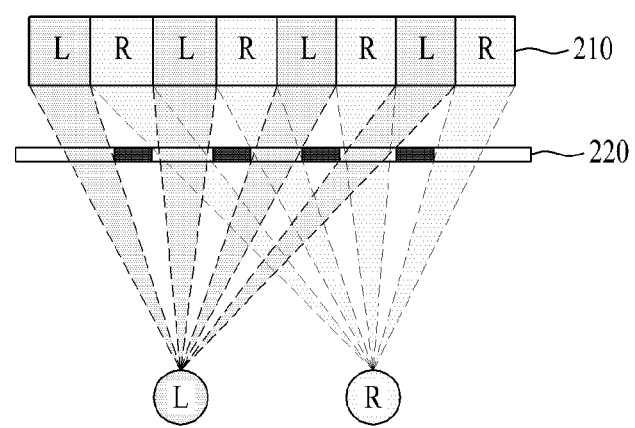
FIG. 4 is a diagram for the concept of a parallax barrier layer for providing a 3D image in connection with the present invention.

FIG. 4 is a diagram for the concept of a parallax barrier layer for providing a 3D image in connection with the present invention.

Referring to FIG. 4, regarding a process for providing a 3D image in a mobile terminal having a parallax barrier layer, a left eye image and a right eye image are alternately displayed on a display panel 210. And, a parallax barrier layer 220 having a plurality of barriers is provided in front of the display panel 210. The parallax barrier layer 220 enables the left eye image and the right eye image to be only incident on a user's left eye and a user's tight eye, respectively. In particular, some of a plurality of the barriers included in the parallax barrier layer 220 limits a light path of the right eye image to prevent the right eye image from being incident on the user's left eye, while the rest of the barriers included in the parallax barrier layer limits a light path of the left eye image to prevent the left eye image from being incident on the user's right eye.

Thus, the parallax barrier layer 220 enables the left eye image and the right eye image of the display panel 210 to be incident only on a user's left eye and a user's tight eye, respectively, thereby enabling a user to view a 3D image.

Figure 5:
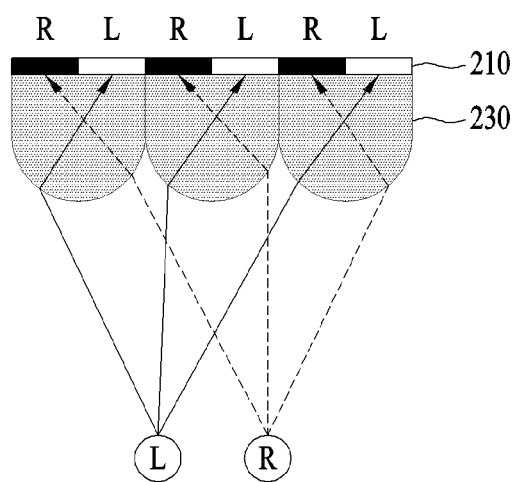
FIG. 5 is a diagram for the concept of a lenticular layer for providing a 3D image in connection with the present invention.

FIG. 5 is a diagram for the concept of a lenticular layer for providing a 3D image in connection with the present invention.

Referring to FIG. 5, regarding a process for providing a 3D image in a mobile terminal having a lenticular layer, a left eye image and a right eye image are alternately displayed on a display panel 210. And, a lenticular layer 230 having a plurality of cylindrical lenticules is provided in front of the display panel 210. The lenticular layer 230 refracts the left and right eye images of the display panel 210, thereby enabling the left eye image and the right eye image to be only incident on a user's left eye and a user's tight eye, respectively.

Thus, the lenticular layer 230 enables the left eye image and the right eye image of the display panel 210 to be incident only on a user's left eye and a user's tight eye, respectively, thereby enabling a user to recognize a 3D image.

Moreover, when a user views the display panel 210 at a different view angle for the lenticular layer 230 and/or the display panel, the lenticular layer refracts an output image of the display panel, thereby enabling the user to view an output image of a different region of the display panel. Using this principle, the present invention enables a user to view one of a plurality of output images outputted to a display panel in accordance with a plurality of preset view angles. To this end, relevant configuration and operations shall be described in detail with reference to the accompanying drawings as follows.

For clarity and convenience of the following description, assume that a mobile terminal may include at least one of the components shown in FIG. 1. Specifically, a present invention applicable mobile terminal may include a display unit 200, a sensing unit 140, a camera 121 and a controller 180.

Figure 6A:
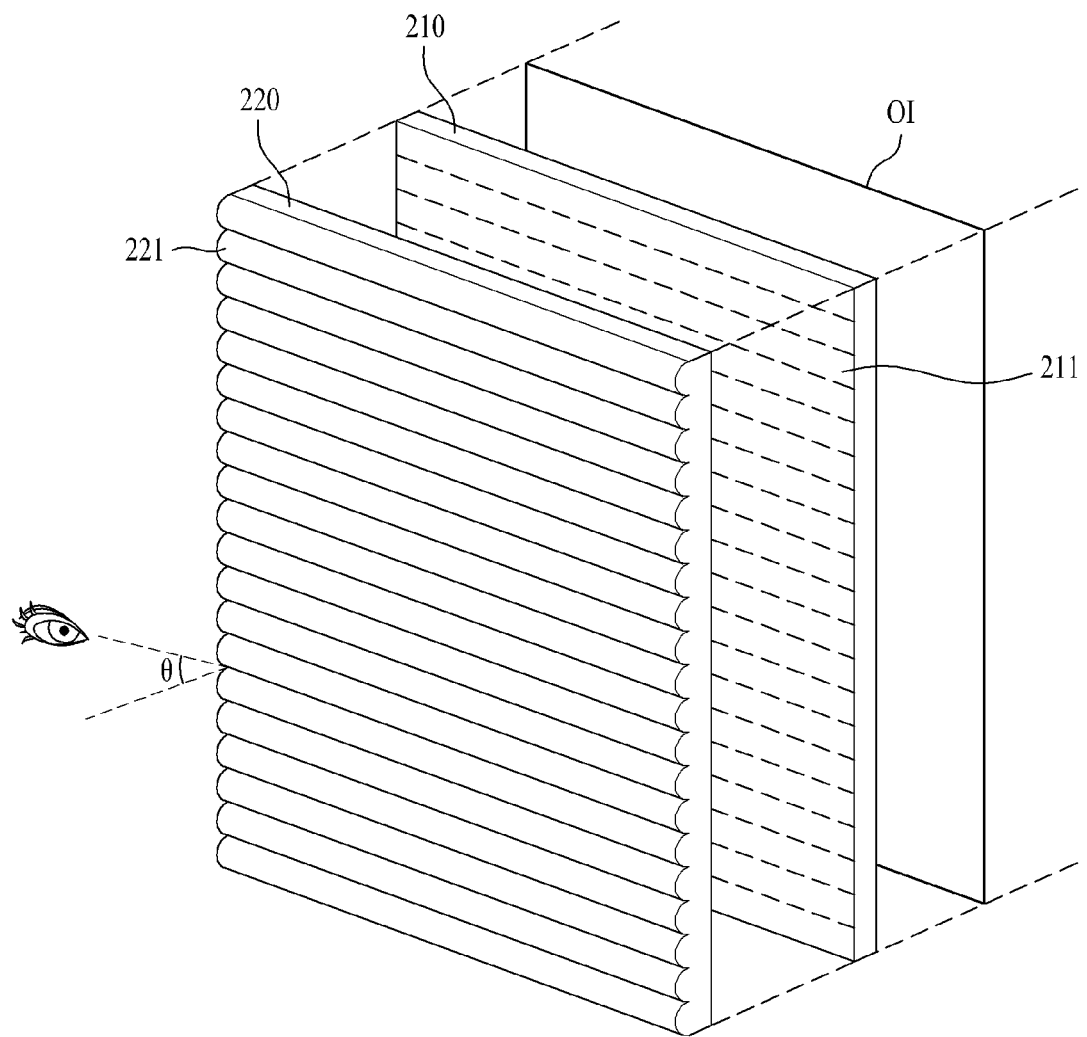
FIG. 6A and FIG. 6B are a schematic exploded perspective diagram and a cross-sectional diagram of a display unit according to the present invention.
Figure 6B:
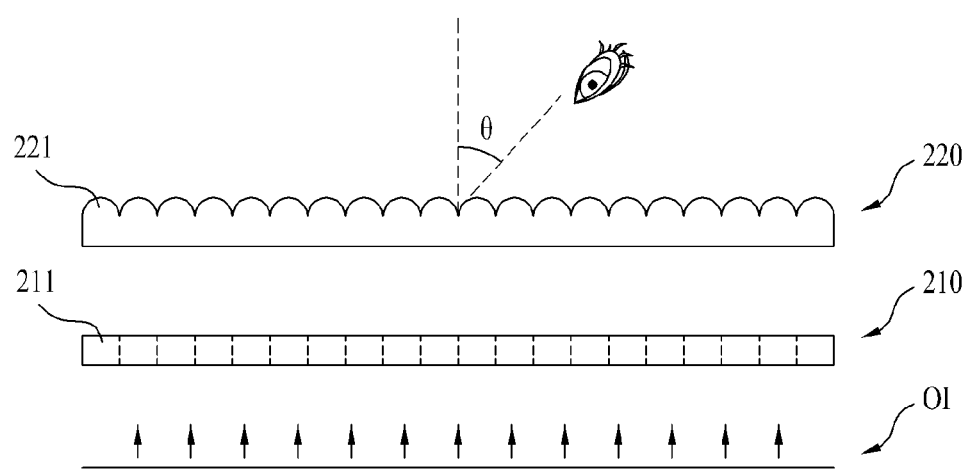
Figure 7A:
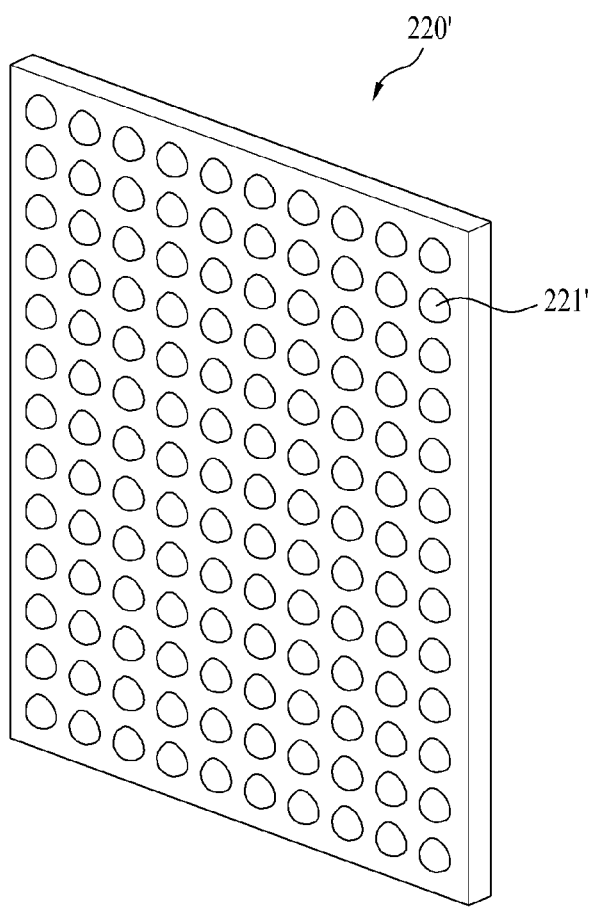
FIGS. 7A to 7C are a schematic perspective diagram, a 1$^{st}$ cross-sectional diagram and a 2$^{nd}$ cross-sectional diagram of a multi-view angle panel according to a modified embodiment of the present invention.
Figure 7B:
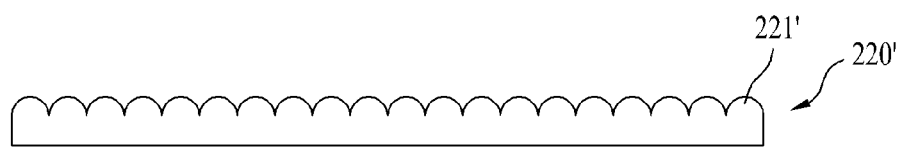
Figure 7C:
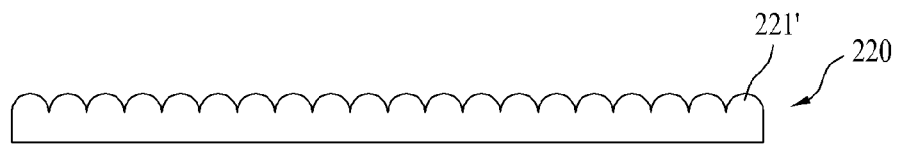

FIG. 6A and FIG. 6B are a schematic exploded perspective diagram and a cross-sectional diagram of a display unit 200 according to the present invention. FIGS. 7A to 7C are a schematic perspective diagram, a $1^{st}$ cross-sectional diagram and a $2^{nd}$ cross-sectional diagram of a multi-view angle panel 220 according to a modified embodiment of the present invention. In particular, the $1^{st}$ cross-sectional diagram and the $2^{nd}$ cross-sectional diagram are provided in accordance with cutting lines perpendicular to each other, respectively.

A mobile terminal according to the present invention may include a display unit 200 configured to display a plurality of output images (OIs) to provide a user with a specific output image (OI) among a plurality of the output images (OI) and a controller controlling the output images (OI) and the display unit 200.

In particular, the controller 180 partitions a display panel 210 into a plurality of display regions 211, partitions a plurality of the output images (OI) into a plurality of partitioned images corresponding to a plurality of the display regions 211, respectively, and then alternately displays a plurality of the partitioned images on a plurality of the display regions 211 in a manner that a plurality of the partitioned images of the same output image (OI) are displayed on the display panel 210 with a preset pitch (P). This is described in detail with reference to the accompanying drawings as follows.

Referring to FIG. 6A and FIG. 6B, the display unit 200 may include a display panel 210 displaying a plurality of output images (OI) processed and outputted by a controller 180 and a multi-view angle panel 220 provided in front of the display panel 210 to provide one of a plurality of the output images (OI) to a user in accordance with a plurality of preset view angles.

Preferably, the display panel 210 may include a panel capable of displaying a 2D image (i.e., a planar image) and a 3D image (i.e., a stereoscopic image). In particular, the display panel 210 may include a plurality of pixels or a plurality of sub pixels. For instance, the display panel 210 may include one of an LED display panel, an LCD display panel (e.g., STN-LCD display panel, TFT-LCD display panel, etc.) and an OLED display panel (e.g., PMOLED display panel, AMOLED display panel, etc.). When a 3D image is displayed on the display panel 210, left eye images (L) and right eye images (R) are sequentially and alternately displayed on the display panel 210. In doing so, each of the left eye images (L) or the right eye images (R) may be displayed by a pixel/sub pixel unit of the display panel 210.

In front of the display panel 210, the multi-view view panel 220 is placed in a manner of being spaced apart from the display panel 210 in a predetermined distance. When a user views the display unit 200 at a different view angle θ, the multi-view view panel 220 refracts a plurality of output images (OI) simultaneously displayed on a plurality of regions of the display unit 200, respectively, and then enables the output image (OI) corresponding to the view angle θ among a plurality of the output images (OI) to be supplied to the user only.

In this case, the view angle θ means an angle formed by a user's eye with an axis vertical to a surface of the display unit 200. The view angle θ may include an angle formed with a portrait direction of the mobile terminal or an angle formed with a landscape direction of the mobile terminal. For clarity and convenience of the following description, assume that the view angle θ includes the angle formed with the portrait direction of the mobile terminal. Yet, in case that a 3D image is displayed on the display unit 200, as mentioned in the following description, the view angle θ preferably includes the angle formed with the portrait direction of the mobile terminal.

Referring to FIG. 6A and FIG. 6B, the multi-view view panel 220 includes a $1^{st}$ lenticular panel 220 having a plurality of cylindrical lenticules 221. In this case, a plurality of the lenticules 221 is formed to correspond to a plurality of the view angles preset in the landscape direction for the output image OI. The lenticule 221 is a micro convex lens. The lenticule 221 refracts a plurality of the output images OI displayed on the display panel 210 at a preset angle, whereby each of a plurality of the output images OI displayed on the display panel 210 is outputted at the preset angle. Hence, if a user fixes a position of eye or face of the user to enable the user's view angle θ to be matched to the preset angle for outputting each of a plurality of the output images OI, i.e., the preset view angle, the user may be able to watch a specific output image OI among a plurality of the output images OI. If the user attempts to watch another output image OI among a plurality of the output images OI, the user just moves the position of the eye or face of the user against the display unit 200 without a separate manipulation of the input unit.

In particular, while a plurality of the output images OI are simultaneously displayed on the display unit 200, the user may be able to watch each of a plurality of the output images OI conveniently and comfortably in a manner of moving the position of the eye or face of the user [i.e., changing the view angle θ of the user].

Referring to FIG. 7A and FIG. 7B, the multi-view view panel 220 may include a microlens panel 220' having a plurality of hemispherical microlenses 221'. In this case, a plurality of the hemispherical microlenses 221' is formed to correspond to a plurality of the preset view angles.

The microlens 221' is a micro convex lens. The microlens 221' refracts a plurality of the output images OI displayed on the display panel 210 at a preset angle, whereby each of a plurality of the output images OI displayed on the display panel 210 is outputted at the preset angle. Hence, if a user fixes a position of eye or face of the user to enable the user's view angle θ to be matched to the preset angle for outputting each of a plurality of the output images OI, i.e., the preset view angle, the user may be able to watch a specific output image OI among a plurality of the output images OI. If the user attempts to watch another output image OI among a plurality of the output images OI, the user just moves the position of the eye or face of the user against the display unit 200 without a separate manipulation of the input unit.

In particular, while a plurality of the output images OI are simultaneously displayed on the display unit 200, the user may be able to watch each of a plurality of the output images OI conveniently and comfortably in a manner of moving the position of the eye or face of the user [i.e., changing the view angle θ of the user].

Besides, the lenticule 221 may be able to provide a user with a plurality of view angles θ for a view angle θ for one direction for either a view angle θ formed in portrait direction with a mobile communication terminal by a user's eye or a view angle θ formed in landscape direction with the mobile communication terminal by the user's eye. Yet, the microlens 221' of the present embodiment may be able to advantageously provide a user with a plurality of view angles θ for a view angle θ in all directions in a view angle θ formed in portrait direction with a mobile communication terminal by a user's eye or a view angle θ formed in landscape direction with the mobile communication terminal by the user's eye.

Figure 8:
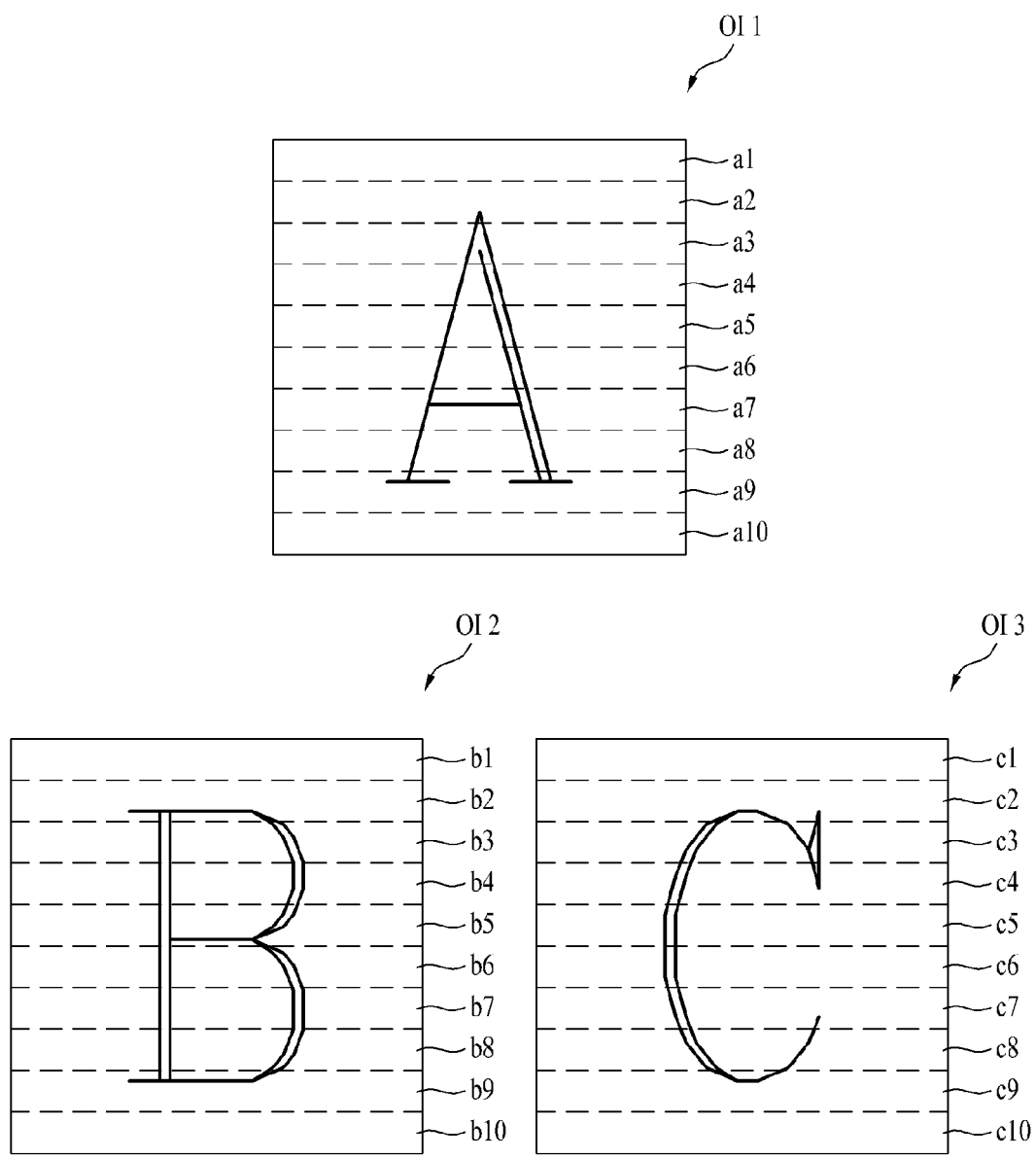
FIG. 8 is a schematic diagram of a plurality of output images outputted by a controller according to the present invention.
Figure 9:
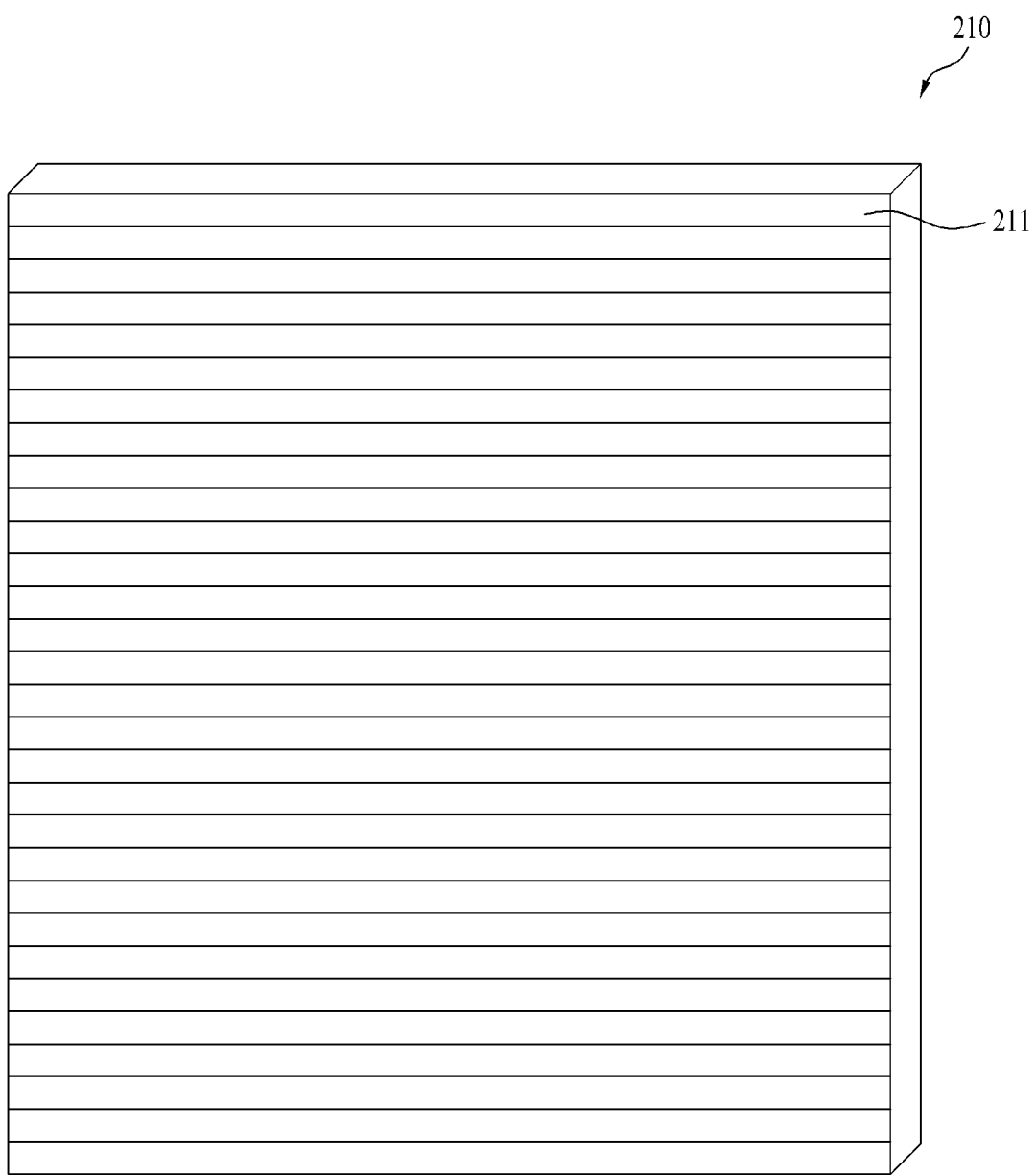
FIG. 9 is a schematic perspective diagram of a display panel partitioned by a controller according to the present invention.
Figure 10:
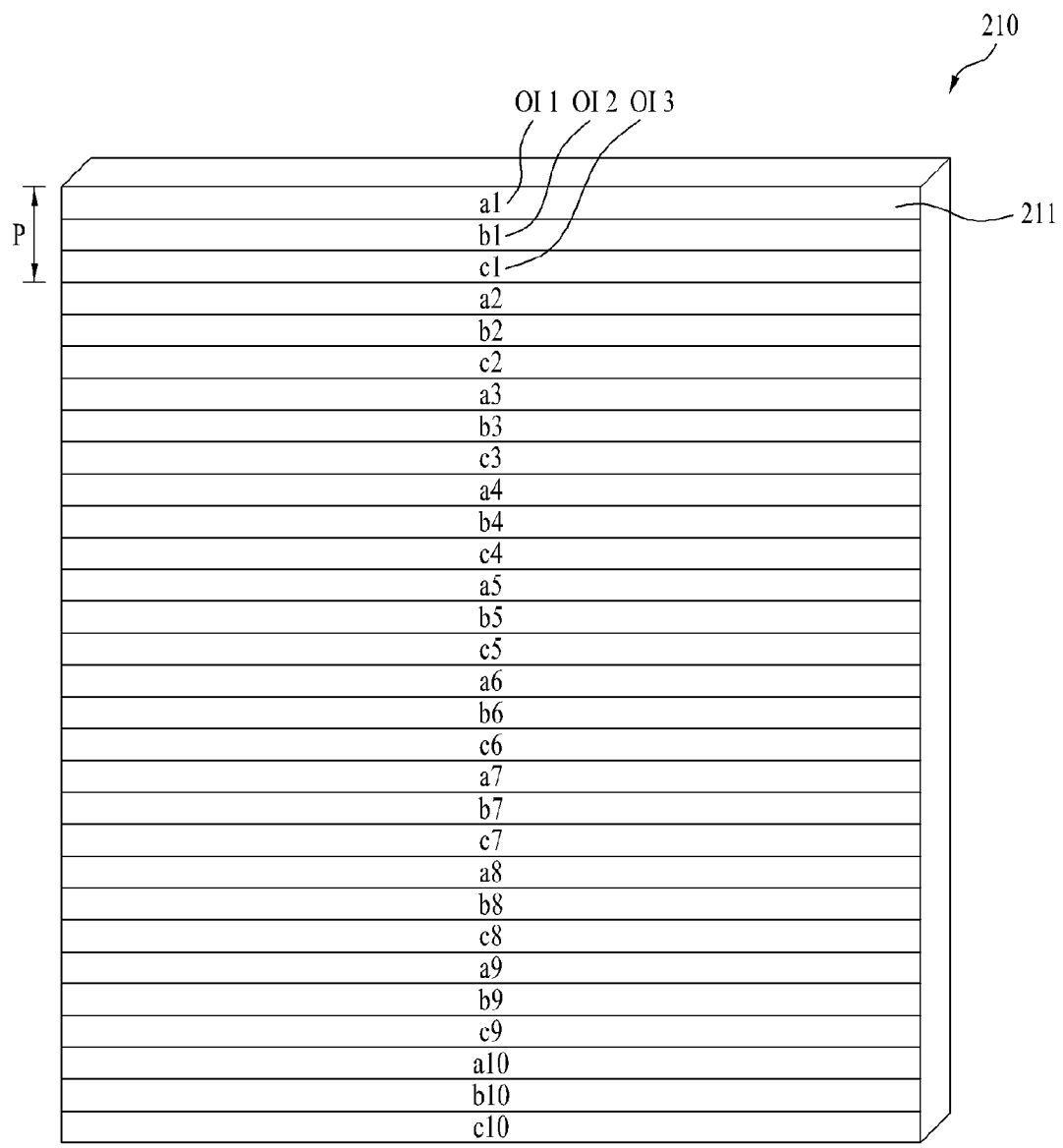
FIG. 10 is a schematic perspective diagram of an output image displayed on a display panel by a controller according to the present invention.
Figure 11:
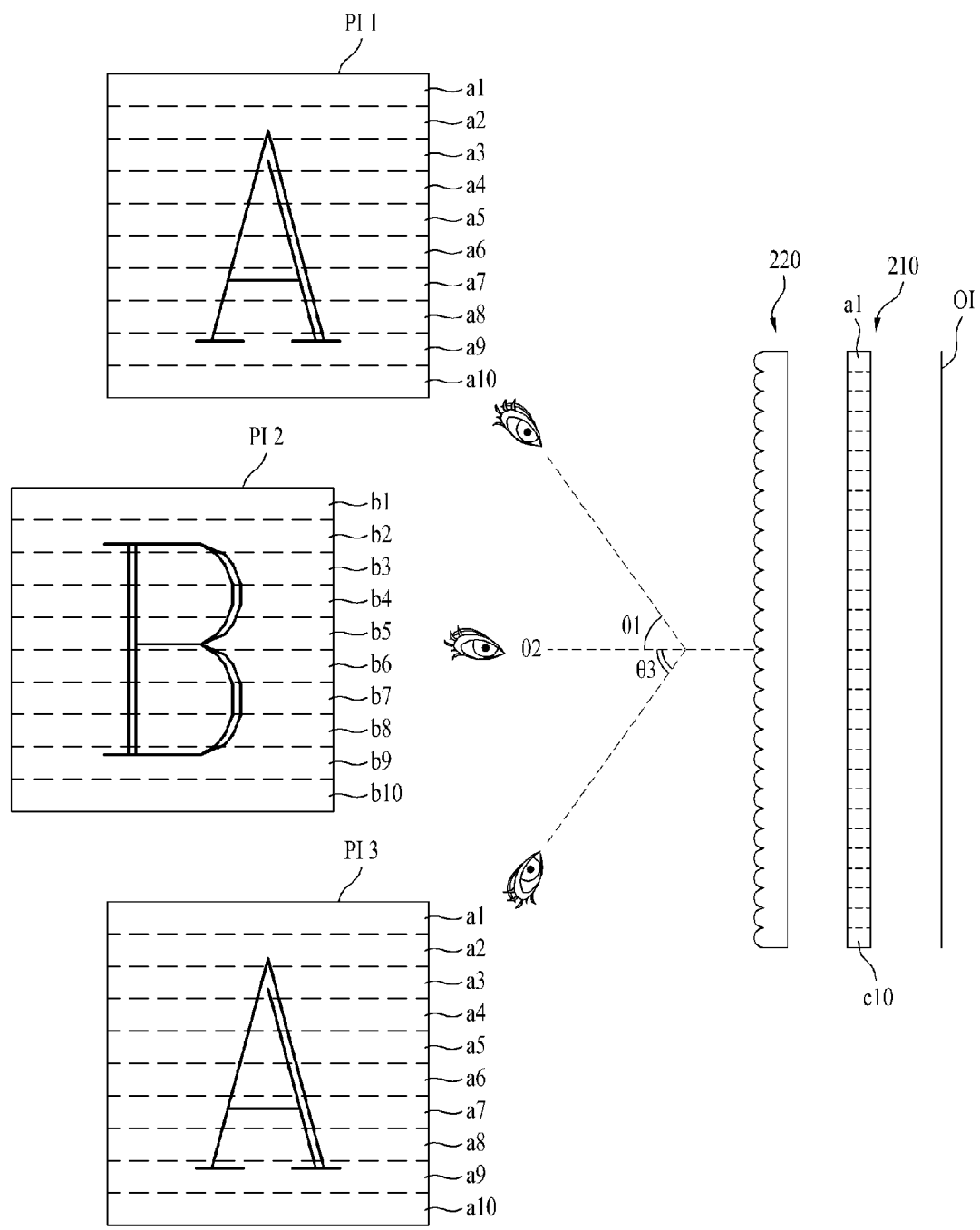
FIG. 11 is a schematic diagram of a perceived image visually delivered to a user by a display unit according to the present invention.

FIG. 8 is a schematic diagram of a plurality of output images OI outputted by a controller 180 according to the present invention. FIG. 9 is a schematic perspective diagram of a display panel 210 partitioned by a controller 180 according to the present invention. FIG. 10 is a schematic perspective diagram of an output image OI displayed on a display panel 210 by a controller 180 according to the present invention. And, FIG. 11 is a schematic diagram of a perceived image(PI) visually delivered to a user by a display unit 200 according to the present invention.

For clarity and convenience of the following description, in case that a quantity of a plurality of output images OI is 3, assume that each of a plurality of the output images OI is partitioned into 10 partitioned images for example, by which the present invention may be non-limited. For reference, in the drawings, a content contained in an output image is indicated by English capital letter (e.g., A, B, C, etc.). And, a content contained in a partitioned image is indicated by English small letter (e.g., a1, a2, a3, a4, a5, . . . , b1, b2, b3, b4, b5, . . . , c1, c2, c3, c4, c5, . . . , etc.).

Referring to FIG. 8, the controller 180 may control each of a plurality of output images OI to be partitioned into a plurality of partitioned images. For instance, referring to FIG. 8, the controller controls 3 output images OI to be displayed on the display panel 210 and partitions each of the 3 output images OI into 10 partitioned images in landscape direction. In particular, the controller 180 simultaneously displays the 3 output images OI, i.e., total 30 partitioned images on the display panel 210.

In particular, the 3 output images OI may include game images broadcasted at multiple angles in a single sports program for example. If a sports program is a baseball game, the 3 output images OI may include an image in viewpoint of a pitcher, an image in viewpoint of a hitter, and an image in viewpoint of spectators.

In particular, the 3 output images OI may relate to 3 entertainment programs. In more particular, among the 3 output images OI, a $1^{st}$ output image OI1 may include a movie program image, a $2^{nd}$ output image OI2 may include a drama program image, and a $3^{rd}$ output image OI3 may include a music program image, for example.

In particular, the 3 output images OI may include output images OI for 3 different applications for example. In more particular, among the 3 output images OI, a $1^{st}$ output image OI1 may include a navigation application image, a $2^{nd}$ output image OI2 may include a banking related application image, and a $3^{rd}$ output image OI3 may include a weather forecast application image, for example.

The above-mentioned 3 output images OI (i.e., a plurality of the output images OI) are just exemplary, by which the present invention may be non-limited.

Referring to FIG. 9, the controller 180 controls the display panel 210 to be partitioned into a plurality of display regions 211 to correspond to a plurality of partitioned images. For instance, referring to FIG. 9, the controller 180 partitions the display panel 210 into 30 display regions 211 to enable the entire portioned images of the 3 output images OI to be simultaneously displayed on the display panel 210. In particular, the display regions 211 are provided in the same landscape direction of the partitioned image of the output image OI.

Subsequently, referring to FIG. 10, the controller 180 alternately displays a plurality of the partitioned images on a plurality of the display regions 211, whereby a plurality of the partitioned images included in the same output image OI among a plurality of the output images OI can be displayed on the display panel 210 with a preset pitch P. In this case, the preset pitch P may correspond to the quantity (i.e., number) of a plurality of the output images OI.

For instance, if the quantity of a plurality of the output images OI is 3, the preset pitch P becomes 3. Referring to FIG. 10, the controller 180 may alternately display the partitioned images of the 3 output images OI on the display regions 211 of the display panel 210 by a unit of 3 partitioned images (i.e., the preset pitch) in order of 'a $1^{st}$ partitioned image of the $1^{st}$ output image OI1, a $1^{st}$ partitioned image of the $2^{nd}$ output image OI2, and a $1^{st}$ partitioned image of the $3^{rd}$ output image OI3'→'a $2^{nd}$ partitioned image of the $1^{st}$ output image OI1, a $2^{nd}$ partitioned image of the $2^{nd}$ output image OI2, and a $3^{rd}$ partitioned image of the $3^{rd}$ output image OI3', . . . , →'a $10^{th}$ partitioned image of the $1^{st}$ output image OI1, a $10^{th}$ partitioned image of the $2^{nd}$ output image OI2, and a $10^{th}$ partitioned image of the $3^{rd}$ output image OI3' from a top display region 211 to a bottom display region 211 of the display panel 210 partitioned into 30 display regions 211.

Since the 3 output images OI are displayed on the display panel 210 in the same manner as mentioned in the above description, it can be observed that a view angle θ for each of the output images OI to be perceived by a user varies in accordance with a corresponding one of the $1^{st}$ output image OI1, the $2^{nd}$ output image OI2 and the $3^{rd}$ output image OI3.

Thus, a plurality of the partitioned images of each of a plurality of the output images OI are displayed on the display panel 210 partitioned into a plurality of the display regions 211 by the controller 180, whereby a plurality of the output images OI can be simultaneously displayed on the display panel 210 to supply one of the output images OI to a user at a specific view angle θ.

Referring to FIG. 11, a plurality of partitioned images of each of a plurality of output images OI alternately displayed by the controller 180 on a plurality of display regions 211 included in the display panel 210 are refracted at a preset view angle by the multi-view angle panel 220 arranged in front of the display panel 210. If a user moves his face and/or eye to match his view angle θ to the preset view angle, the user may be able to watch one of a plurality of the output images OI in accordance with a preset angle. If a user moves his face and/or eye to a position corresponding to another preset view angle, the user may be able to watch another one of a plurality of the output images OI.

For instance, referring to FIG. 11, if a user's view angle θ is matched to a $1^{st}$ preset view angle θ1, the user may be able to watch a $1^{st}$ perceived image PI1 corresponding to a $1^{st}$ output image OI1. And, if a user's view angle θ is matched to a $2^{nd}$ preset view angle θ2, the user may be able to watch a $2^{nd}$ perceived image PI2 corresponding to a $2^{nd}$ output image OI2. Moreover, if a user's view angle θ is matched to a $3^{rd}$ preset view angle θ3, the user may be able to watch a $3^{rd}$ perceived image PI3 corresponding to a $3^{rd}$ output image OI2.

Preferably, the preset view angle may be user-specified to each of a plurality of the output images OI. Preferably, a quantity (i.e., number) of the preset view angles may be user-specified.

As mentioned in the above description, the present invention enables a user to change and watch a 2D image on the display unit 200 in a manner of changing the view angle θ only without manipulating an input unit separately. Therefore, the present invention provides a user with convenience and facilitation in switching a screen, thereby enabling the user to watch various images at multiple angles simultaneously.

Figure 12:
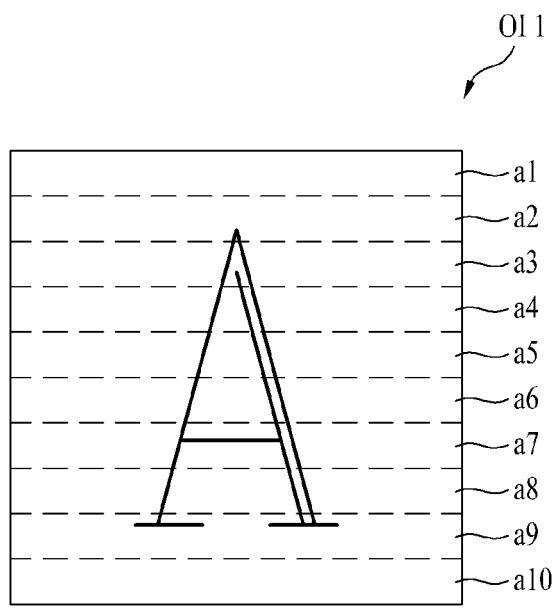
FIG. 12 is a schematic diagram of output images of different types outputted by a controller according to the present invention.
Figure 12:
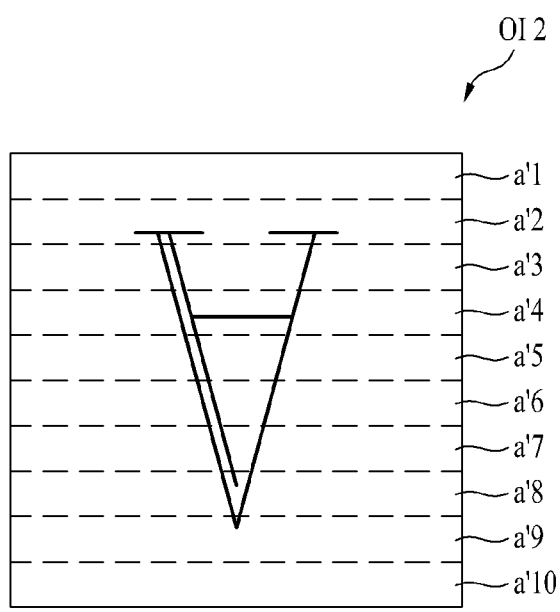
Figure 13:
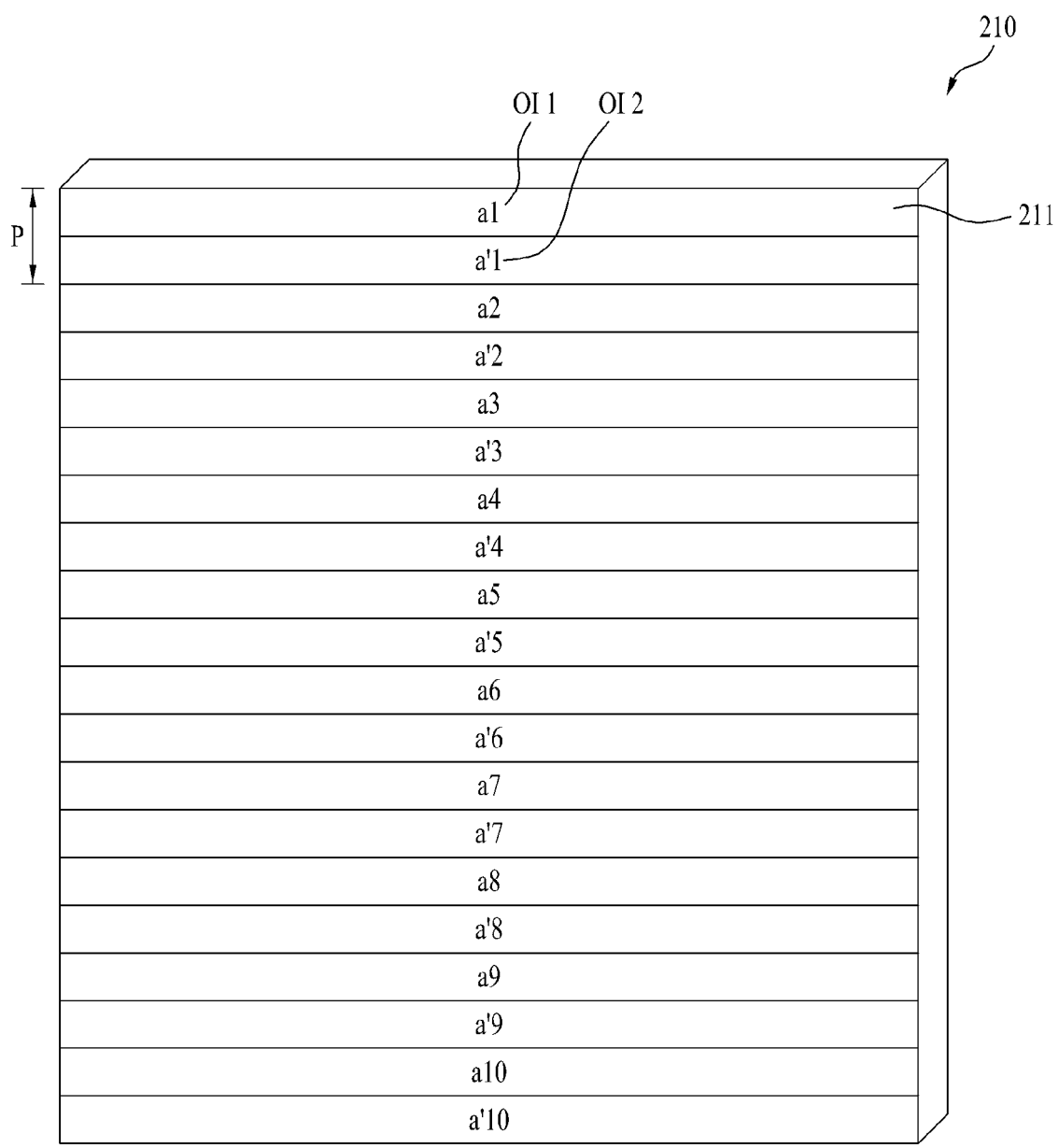
FIG. 13 is a schematic diagram of the output images, which are shown in FIG. 12, displayed on a display panel by a controller according to the present invention.
Figure 14:
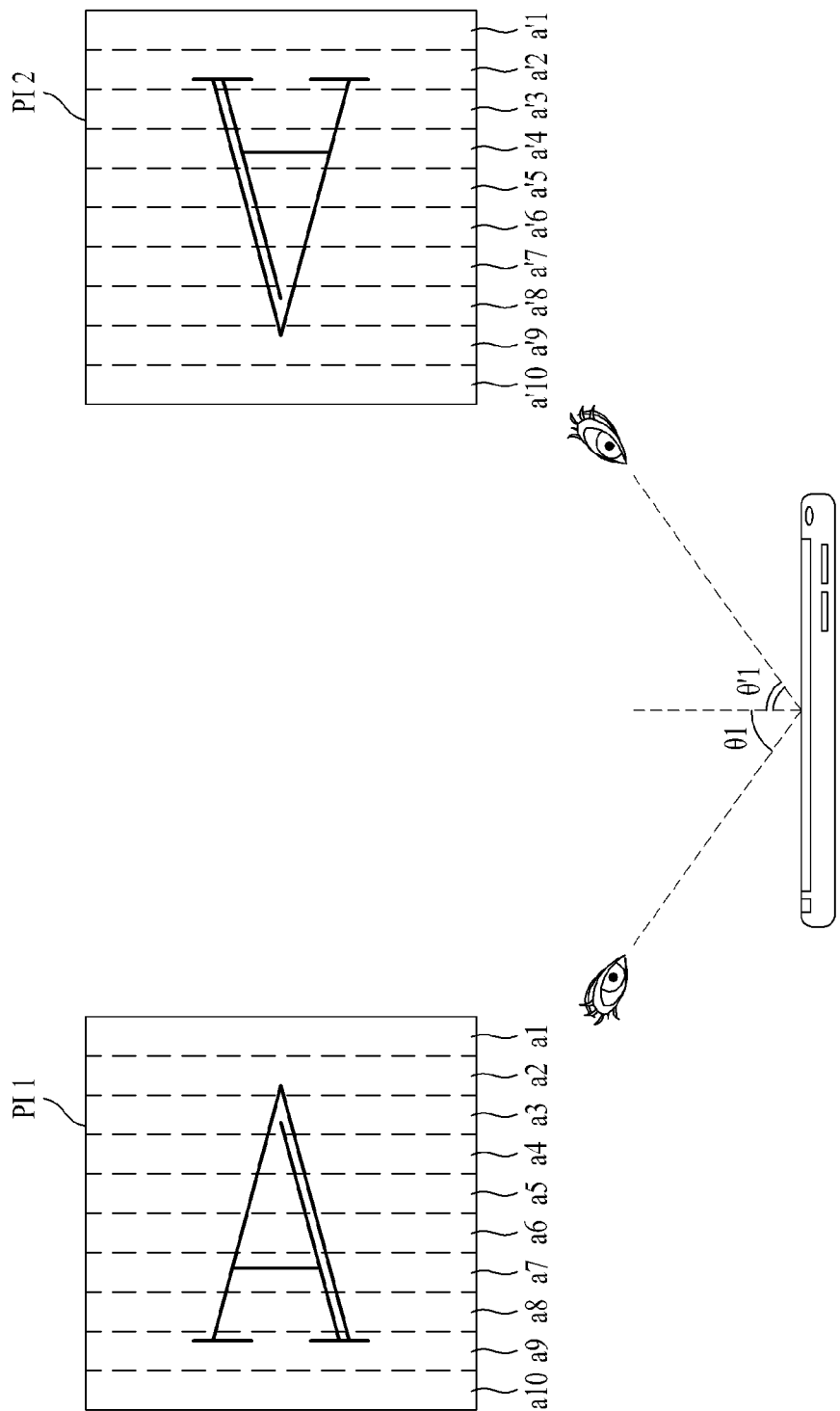
FIG. 14 is a schematic diagram of perceived images of the output images, which are shown in FIG. 12, visually delivered to a user by a display unit according to the present invention.

FIG. 12 is a schematic diagram of output images OI of different types outputted by a controller 180 according to the present invention. FIG. 13 is a schematic diagram of the output images OI, which are shown in FIG. 12, displayed on a display panel 210 by a controller 180 according to the present invention. And, FIG. 14 is a schematic diagram of perceived images PI of the output images OI, which are shown in FIG. 12, visually delivered to a user by a display unit 200 according to the present invention.

Referring to FIG. 12, the controller 180 controls each of a plurality of output images OI to be partitioned into a plurality of partitioned images.

In this case, a plurality of the output images OI includes 2 output images OI representing the same content. And, a phase difference between the 2 output images is 180 degrees.

In particular, according to the present embodiment, the controller 180 controls the display unit 200 (i.e., the display panel 210) and the output images OI in a manner that the phase difference of the 2 output images OI becomes 180 degrees.

For instance, referring to FIG. 12, the controller 180 controls the output images OI in a manner that 2 output images OI having a phase difference of 180 degrees in-between are displayed on the display panel 210. And, the controller 180 partitions each of the 2 output images OI into 10 partitioned images in landscape direction. In particular, the controller 180 simultaneously displays 2 output images OI, i.e., total 20 partitioned mages on the display panel 210.

In this case, the 2 output images OI may include contents related to one presentation (or a business meeting) for example. Hence, 2 users may be able to simultaneously watch one material via one mobile terminal opposite to the 2 users.

In this case, the 2 output images OI may include one entertainment program for example. Hence, 2 users may be able to simultaneously enjoy one entertainment program via one mobile terminal opposite to the 2 users.

In the above description, the 2 output images OI (i.e., a plurality of output images OI) of the same contents are exemplary, by which the present invention may be non-limited.

Subsequently, the controller 180 controls the display panel 210 to be partitioned into a plurality of display regions 211 to correspond to a plurality of the partitioned images, respectively. For instance, the controller 180 partitions the display panel 210 into 20 display regions 211 to enable the entire portioned images of the 2 output images OI having the phase difference of 180 degrees in-between to be simultaneously displayed on the display panel 210. In particular, the display regions 211 are provided in the same landscape direction of the partitioned images of the output image OI.

Thereafter, referring to FIG. 13, the controller 180 alternately displays a plurality of the partitioned images on a plurality of the display regions 211, whereby a plurality of the partitioned images included in the same output image OI among a plurality of the output images OI can be displayed on the display panel 210 with a preset pitch P. In this case, the preset pitch P may correspond to the quantity (i.e., number) of a plurality of the output images OI.

For instance, if the quantity of a plurality of the output images OI is 2, the preset pitch P becomes 2. referring to FIG. 13, the controller 180 may alternately display the partitioned images of the 2 output images OI on the display regions 211 of the display panel 210 by a unit of 2 partitioned images (i.e., the preset pitch) in order of 'a $1^{st}$ partitioned image of the $1^{st}$ output image OI1 and a $1^{st}$ partitioned image of the $2^{nd}$ output image OI2' → 'a $2^{nd}$ partitioned image of the $1^{st}$ output image OI1 and a $2^{nd}$ partitioned image of the $2^{nd}$ output image OI2', . . . , → 'a $10^{th}$ partitioned image of the $1^{st}$ output image OI1 and a $10^{th}$ partitioned image of the $2^{nd}$ output image OI2' from a top display region 211 to a bottom display region 211 of the display panel 210 partitioned into 20 display regions 211.

Since the 2 output images OI are displayed on the display panel 210 in the same manner as mentioned in the above description, it can be observed that a view angle θ for each of the output images OI to be perceived by a user varies in accordance with a corresponding one of the $1^{st}$ output image OI1 and the $2^{nd}$ output image OI2.

Thus, a plurality of the partitioned images of each of a plurality of the output images OI are displayed on the display panel 210 partitioned into a plurality of the display regions 211 by the controller 180, whereby a plurality of the output images OI can be simultaneously displayed on the display panel 210 to supply one of the output images OI to a user at a specific view angle δ.

Referring to FIG. 14, a plurality of partitioned images of each of a plurality of 2 output images OI (having a phase difference of 180 degrees in-between) alternately displayed by the controller 180 on a plurality of display regions 211 included in the display panel 210 are refracted at a $1^{st}$ preset view angle θ1 and a $2^{nd}$ preset view angle θ2 by the multi-view angle panel 220 arranged in front of the display panel 210. If 2 users opposite to each other move their faces and/or eyes to positions matched to the $1^{st}$ view angle θ1 and the $2^{nd}$ preset view angle θ2, respectively, any one of the 2 users opposite to each other may be able to watch one output image OI not in a reverse posture but in a normal posture.

For instance, referring to FIG. 14, if one of the 2 users moves his face and/or eye to match his view angle θ to a $1^{st}$ preset view angle θ1, the corresponding user may be able to watch a $1^{st}$ perceived image PI1 corresponding to a $1^{st}$ output image OI1 in normal posture. If the other user moves his face and/or eye to match his view angle θ to a $2^{nd}$ preset view angle θ2, the corresponding user may be able to watch a $2^{nd}$ perceived image PI2 corresponding to a $2^{nd}$ output image OI2 (having the same content of the $1^{st}$ output image OI1 with a phase difference of 180 degrees) in normal posture.

As mentioned in the above description, the controller 180 controls the 2D image to be displayed on the display panel 210 only. Yet, the following description relates to a case that a 2D image and/or a 3D image are displayed on the display panel 210. To avoid the redundant description, details for the same components as explained in the foregoing description shall be omitted if possible.

Figure 15A:
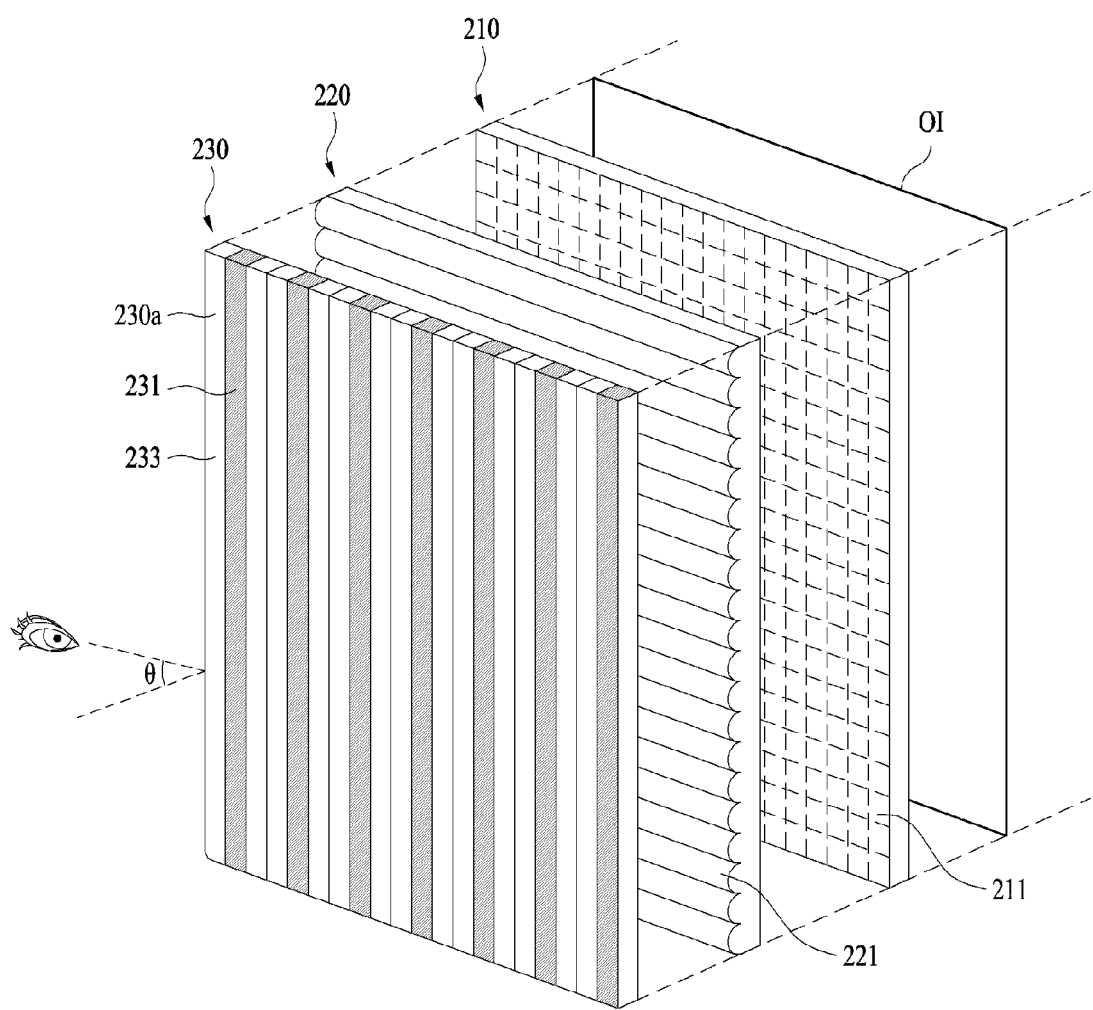
FIG. 15A and FIG. 15B are a schematic exploded perspective diagram and a cross-sectional diagram of a display unit according to a 1$^{st}$ additional embodiment of the present invention.
Figure 15B:
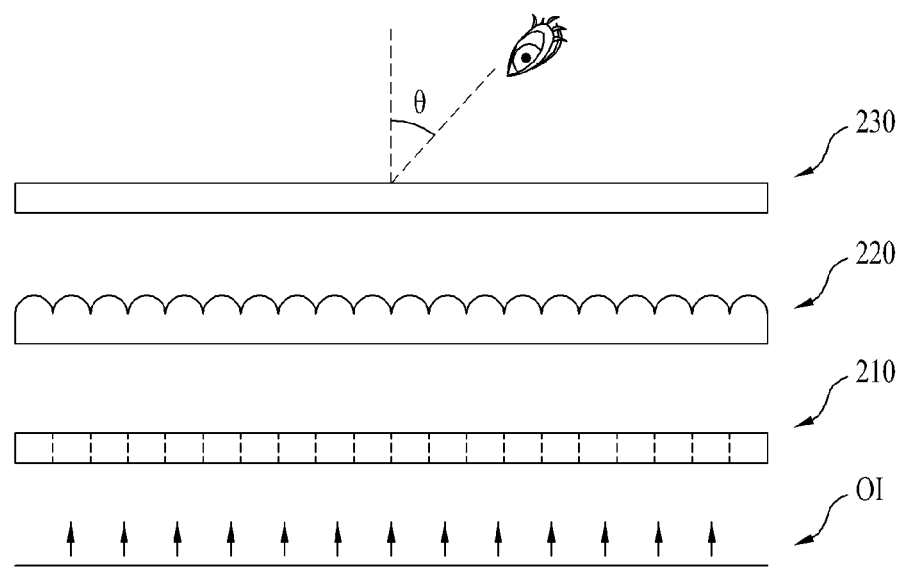
Figure 16A:
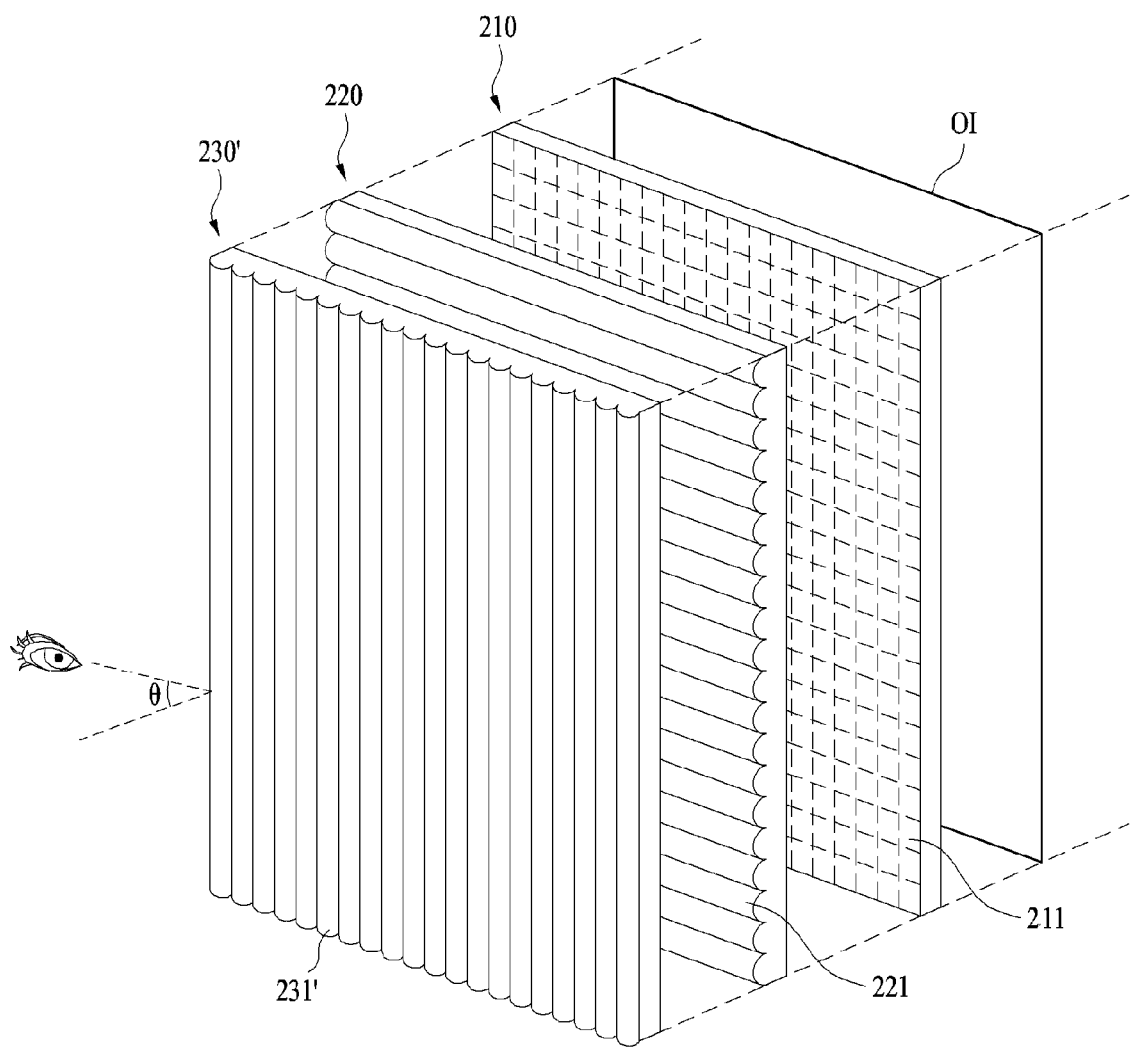
FIG. 16A and FIG. 16B are a schematic exploded perspective diagram and a cross-sectional diagram of a display unit according to a modified embodiment of a 1$^{st}$ additional embodiment of the present invention.
Figure 16B:
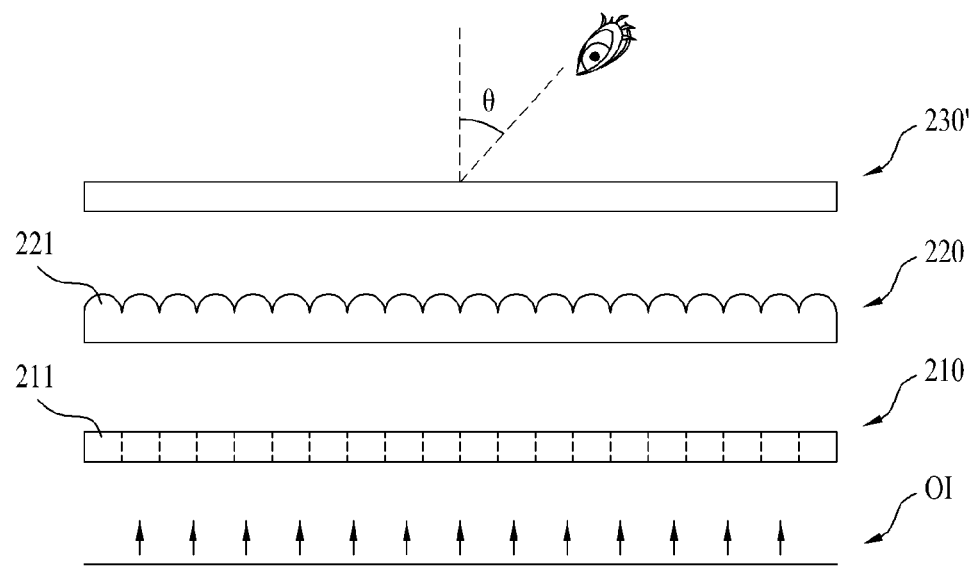

FIG. 15A and FIG. 15B are a schematic exploded perspective diagram and a cross-sectional diagram of a display unit 200 according to a $1^{st}$ additional embodiment of the present invention. FIG. 16A and FIG. 16B are a schematic exploded perspective diagram and a cross-sectional diagram of a display unit 200 according to a modified embodiment of a $1^{st}$ additional embodiment of the present invention.

Referring to FIG. 15A and FIG. 15B, a mobile terminal according to the present invention may include a display unit 200 configured to display a plurality of output images (OIs) to provide a user with a specific output image (OI) among a plurality of the output images (OI) and a controller controlling the output images (OI) and the display unit 200.

In particular, the controller 180 partitions a display panel 210 into a plurality of display regions 211, partitions a plurality of the output images (OI) into a plurality of partitioned images corresponding to a plurality of the display regions 211, respectively, and then alternately displays a plurality of the partitioned images on a plurality of the display regions 211 in a manner that a plurality of the partitioned images of the same output image (OI) are displayed on the display panel 210 with a preset pitch (P). In doing so, the output image OI may be a 3D image including a left eye image and a right eye image alternately arranged on the display panel 20. For reference, in the drawings, contents included in a left eye image of a $1^{st}$ output image OI1 are indicated by L1, L2, L3, L4, L5, . . . , L10, respectively, contents included in a right eye image of the $1^{st}$ output image OI1 are indicated by R1, R2, R3, R4, R5, . . . , R10, respectively, contents included in a left eye image of a $2^{nd}$ output image OI2 are indicated by L'1, L'2, L'3, L'4, L'5, . . . , L'10, respectively, and contents included in a right eye image of the $2^{nd}$ output image OI2 are indicated by R'1, R'2, R'3, R'4, R'5, . . . , R'10.

In particular, the controller 180 may be able to control the display panel 210 and the output images OI to display a plurality of 3D images to the displayed on the display panel 210.

The display unit 200 may include a display panel 210 displaying a plurality of output images (OI) (or 3D images and/or 2D images) processed and outputted by a controller 180, a multi-view angle panel 220 provided in front of the display panel 210 to provide one of a plurality of the output images (OI) to a user in accordance with a plurality of preset view angles, and a 3D image supply panel 230 configured to supply a 3D image to enable a user to perceive the 3D image among a plurality of the output images OI.

Preferably, the display panel 210 may include a panel capable of displaying both a 2D image (i.e., a planar image) and a 3D image (i.e., a stereoscopic image).

In front of the display panel 210, the multi-view view panel 220 is placed in a manner of being spaced apart from the display panel 210 in a predetermined distance. When a user views the display unit 200 at a different view angle θ, the multi-view view panel 220 refracts a plurality of output images (OI) simultaneously displayed on a plurality of regions of the display unit 200, respectively, and then enables the output image (OI) corresponding to the view angle θ among a plurality of the output images (OI) to be supplied to the user only.

As mentioned in the foregoing description, the multi-view angle panel 220 includes a $1^{st}$ lenticular panel 220. Hence, as mentioned in the foregoing description, if a user fixes a position of an eye or face of the user to enable the user's view angle θ to be matched to the preset angle for outputting each of a plurality of the output images OI (3D images and/or 2D images), i.e., the preset view angle, the user may be able to watch a specific output image OI among a plurality of the output images OI. If the user attempts to watch another output image OI among a plurality of the output images OI, the user just moves the position of the eye or face of the user against the display unit 200 without a separate manipulation of the input unit.

In particular, while a plurality of the output images OI are simultaneously displayed on the display unit 200, the user may be able to watch each of a plurality of the output images OI conveniently and comfortably in a manner of moving the position of the eye or face of the user [i.e., changing the view angle θ of the user]. In doing so, a plurality of the output images OI may include 3D images all, 2D images all, or 3D images and 2D images in part.

In front of the display panel 210, the 3D image supply panel 230 is arranged in a manner of being spaced apart from the display panel 210 in a predetermined distance. In particular, the 3D image supply panel 230 in front of the display panel 210 may be provided in front or rear of the multi-view angle panel 220.

The 3D image supply panel 230 may be able to cut off or refract a light path of a left/right eye image of a 3D image to supply the left/right eye image displayed on the display panel 210 to a left/right eye of a user.

Referring to FIG. 15A and FIG. 15B, the 3D image supply panel 230 may include a barrier panel 230 having a plurality of light cutoff parts 231 and a plurality of light-transmitting parts 233 situated between a plurality of the light cutoff parts 231. Preferably, the barrier panel 230 may be configured with parallax barriers.

A plurality of the light cutoff parts 231 and a plurality of the light transmitting parts 233 are formed in direction vertical to the output image OI displayed on the display unit 200. The light cutoff part 231 prevents the left/right eye image of the display panel 210 from being formed on the right/left eye of the user or viewer.

The barrier panel 230 includes a plurality of sub pixels 230a. A size (or pitch) of each of the sub pixels 230a of the barrier panel 230 is smaller than that of a unit pixel of each left/right eye image of the display panel 210. For instance, regarding the sub pixels 230a of the barrier panel 230, the unit pixel of each left/right eye image can be configured to correspond to 5 sub pixels of the barrier panel 230. Of course, the number of the sub pixels 230a of the barrier panel 230 corresponding to the unit pixel of the display panel 210 may be incremented or decremented more or less.

The barrier panel 230 may include a panel similar to the display panel 210. Preferably, the barrier panel 230 may include a TOLED (transparent OLED) panel. In particular, the TOLED panel is transparent like a glass if a power is not supplied to the TOLED panel. And, the TOLED panel is able to display an image if a power is supplied to the TOLED panel. Thus, when the barrier panel 230 includes the TOLED panel, if a 2D image (i.e., a planar image) is displayed on the display panel 210, the light cutoff part 231 of the barrier panel 230 is turned off so that a user can watch a 2D image clearly without view interruption caused by the light cutoff part 231. In particular, if the barrier panel 230 includes the TOLED panel, a viewer may be able to optionally watch both a 2D image and a 3D image via a single mobile terminal 100.

Since the TOLED panel of the barrier panel 230 needs the light cutoff part 231 only in case of being supplied with a power, the TOLED panel of the barrier panel 230 preferably includes a TOLED panel capable of displaying a single color (e.g., black) only instead of displaying a plurality of colors. Thus, as the single-color TOLED is adopted, it may be able to reduce a manufacturing cost of the barrier panel.

Referring to FIG. 16A and FIG. 16B, the 3D image supply panel 230 may include a $2^{nd}$ lenticular panel 230' having a plurality of lenticules 231' formed in portrait direction of the output images OI.

Unlike the $1^{st}$ lenticular panel 220, the $2^{nd}$ lenticular panel 230' does not provide an output image OI differing in accordance with a view angle θ in portrait direction but refracts a light path of a left/right eye image of the display panel 210 to form the left/right eye image at a left/right eye of a user only.

Thus, as the present invention includes the 3D image supply panel 230, a user is able to switch and watch a 2D image and/or a 3D image on the display unit 200 by changing a view angle θ only and an input unit can be changed to correspond to the switched 2D image and/or the switched 3D image.

Figure 17:
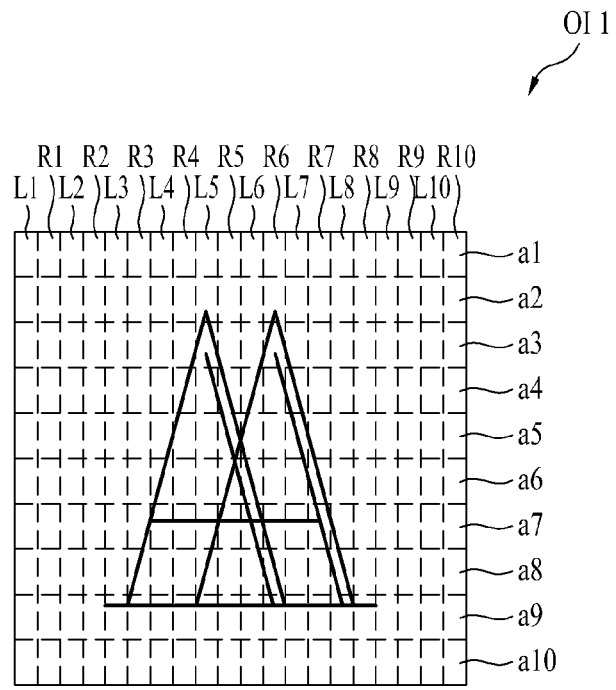
FIG. 17 is a schematic diagram of a plurality of output images outputted by a controller according to the present invention.
Figure 17:
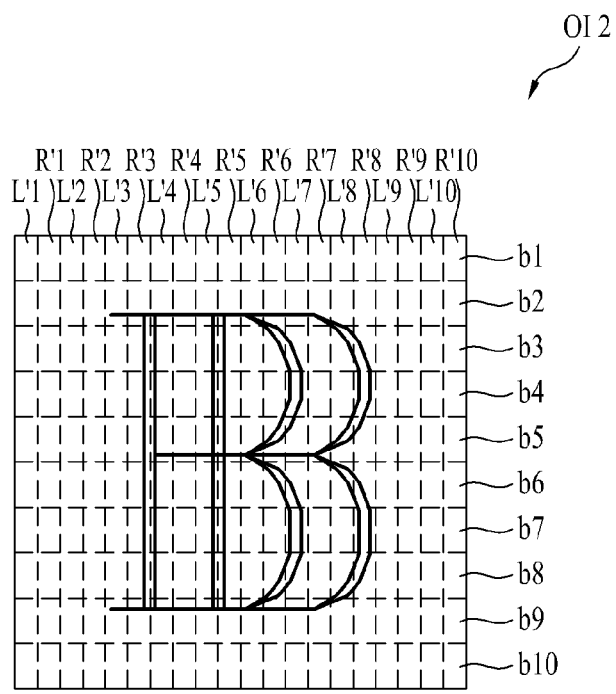
Figure 18:
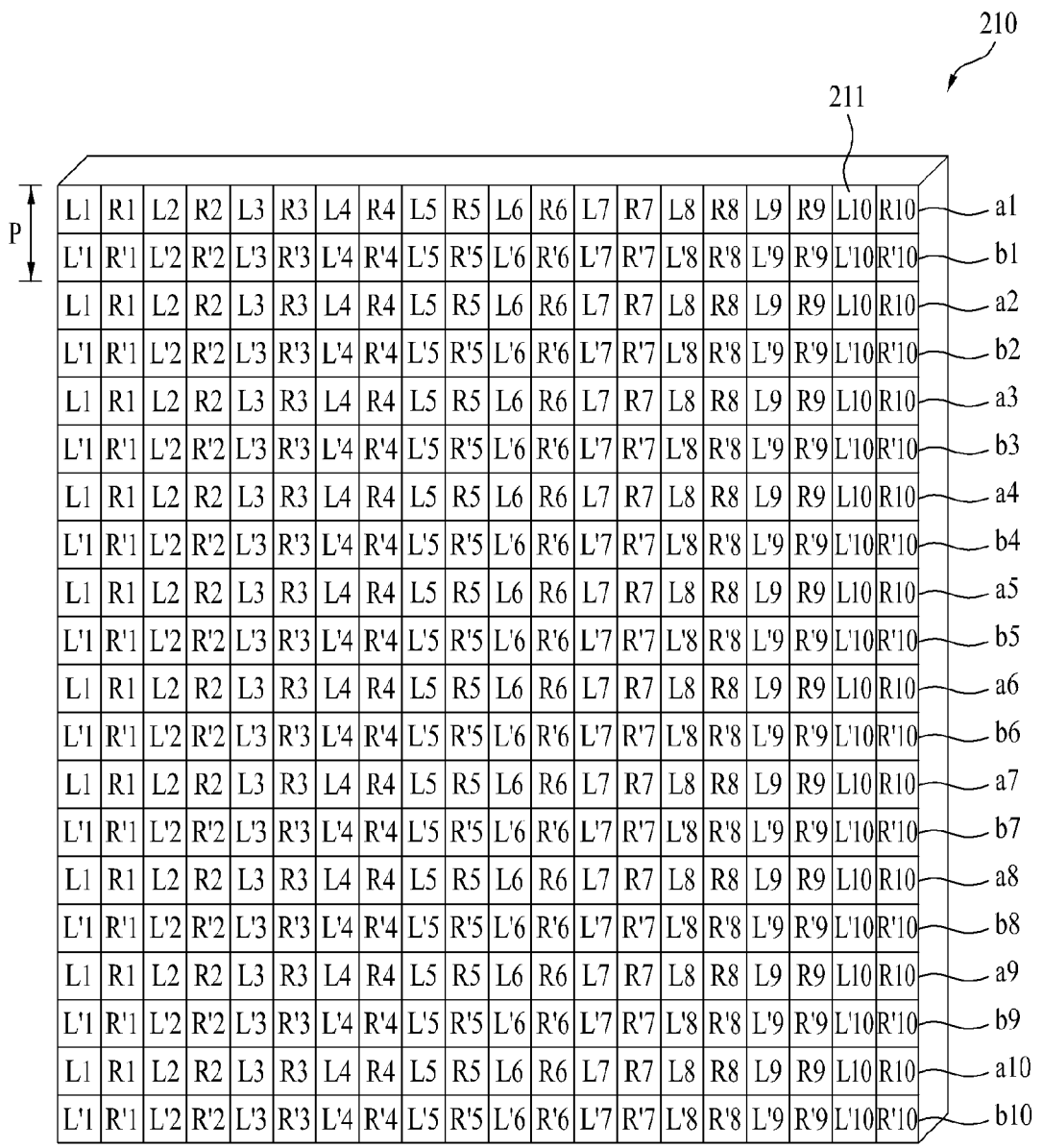
FIG. 18 is a schematic diagram of the output image, which is shown in FIG. 17, displayed on a display panel by the controller according to the present invention.
Figure 19:
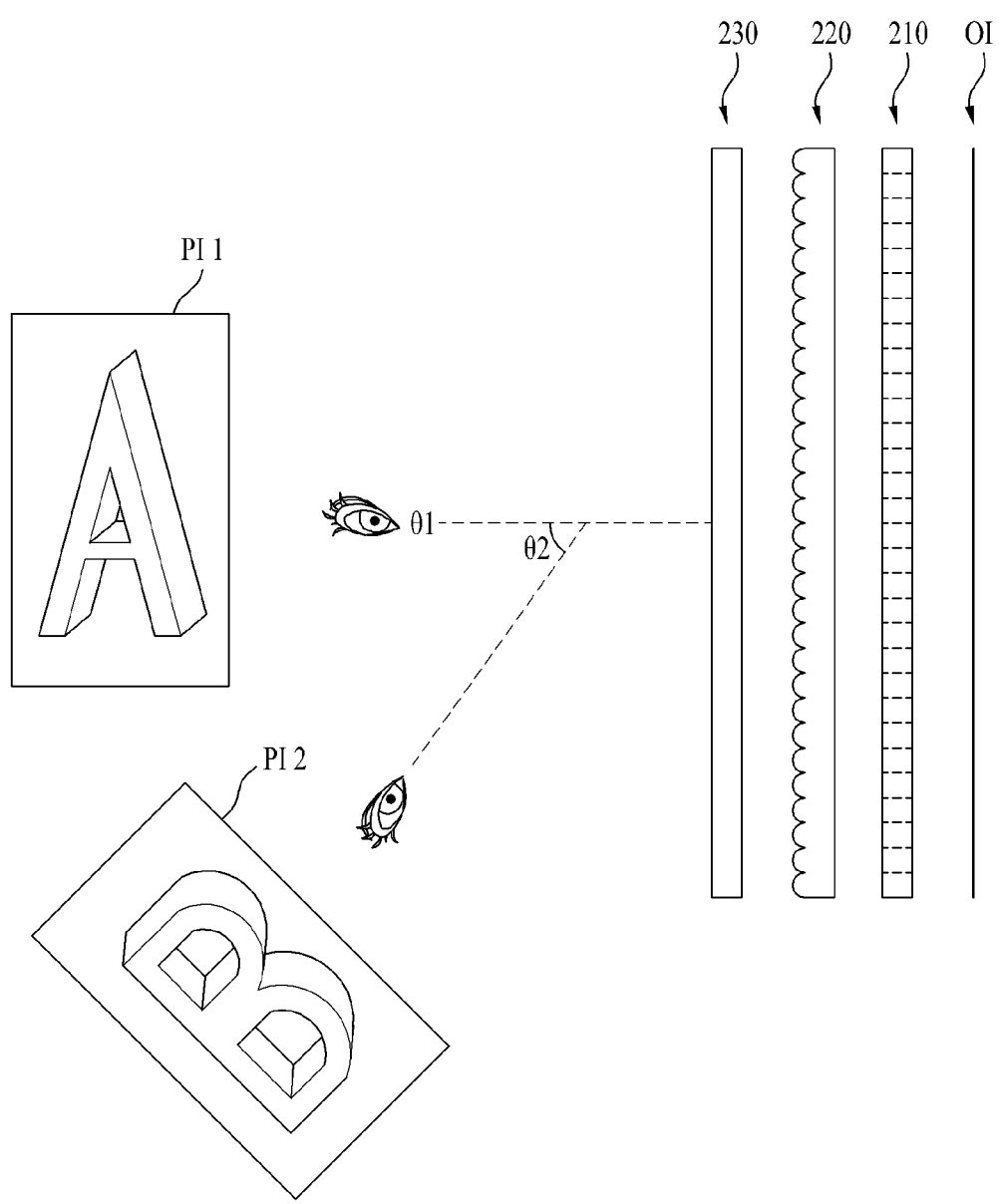
FIG. 19 is a schematic diagram of a perceived image of the output image, which is shown in FIG. 17, visually delivered to a user by a display unit according to the present invention.

FIG. 17 is a schematic diagram of a plurality of output images OI outputted by a controller 180 according to the present invention in case that a plurality of the output images OI are 3D images. FIG. 18 is a schematic diagram of the output images, which are shown in FIG. 17, displayed on a display panel 210 by the controller 180 of the present invention in case that a plurality of the output images OI are 3D images. And, FIG. 19 is a schematic diagram of perceived images PI of the output images, which are shown in FIG. 17, visually delivered to a user by a display unit 200 according to the present invention.

Referring to FIG. 17, the controller 180 may control each of a plurality of output images OI to be partitioned into a plurality of partitioned images. In this case, each of the output images OI is a 3D image and the 3D image includes a left eye image and a right eye image. In particular, referring to FIG. 17, the controller 180 partitions $1^{st}/2^{nd}$ output images OI1 and OI2 including a plurality of left eye images and a plurality of right eye images by being included in a plurality of the output images OI into a plurality of partitioned images (for example).

For instance, referring to FIG. 17, the controller controls the output images OI in a manner that 2 output images OI are displayed on the display panel 210 and partitions each of the 2 output images OI into 10 partitioned images in landscape direction. In particular, the controller 180 simultaneously displays the 2 output images OI, i.e., total 20 partitioned images on the display panel 210.

In particular, the 2 output images OI may include game images broadcasted at multiple angles in a single sports program for example. If a sports program is a baseball game, the 2 output images OI may include an image in viewpoint of a pitcher and an image in viewpoint of a hitter.

In particular, the 2 output images OI may relate to 2 entertainment programs for example. In more particular, in the 2 output images OI, a $1^{st}$ output image OI1 may include a movie program image and a $2^{nd}$ output image OI2 may include a drama program image, for example.

In particular, the 2 output images OI may include output images OI for 2 different applications for example. In more particular, in the 2 output images OI, a $1^{st}$ output image OI1 may include a navigation application image and a $2^{nd}$ output image OI2 may include a weather forecast application image, for example.

The above-mentioned 2 output images OI (i.e., a plurality of the output images OI) are just exemplary, by which the present invention may be non-limited.

Referring to FIG. 18, the controller 180 controls the display panel 210 to be partitioned into a plurality of display regions 211 to correspond to a plurality of partitioned images including a plurality of left eye images and a plurality of right eye images. In particular, referring to FIG. 18, the controller 180 partitions the display panel 210 in landscape direction to correspond to a plurality of the partitioned images of a $1^{st}$ output image OI1 and a plurality of the partitioned images of a $2^{nd}$ output image OI2 and also partitions the display panel 210 in portrait direction to correspond to a plurality of the left and right eye images included in the $1^{st}$ output image OI1 and a plurality of the left and right eye images included in the $2^{nd}$ output image OI2.

For instance, referring to FIG. 18, the controller 180 partitions the display panel 210 into 20 display regions 211 in landscape direction to enable the entire portioned images of the 2 output images OI to be simultaneously displayed on the display panel 210 and also partitions the display panel 210 into 20 display regions 211 in portrait direction to enable a plurality of the left eye images of the 2 output images OI and a plurality of the right eye images of the 2 output images OI to be simultaneously displayed on the display panel 210. In particular, the controller 180 partitions the display panel 210 into 20×20 display regions 211 for example, by which the present invention may be non-limited.

Subsequently, referring to FIG. 18, the controller 180 alternately displays a plurality of the partitioned images on a plurality of the display regions 211, whereby a plurality of the partitioned images included in the same output image OI among a plurality of the output images OI can be displayed on the display panel 210 with a preset pitch P. In this case, the preset pitch P may correspond to the quantity (i.e., number) of a plurality of the output images OI.

For instance, if the quantity of a plurality of the output images OI is 2, the preset pitch P becomes 2. Referring to FIG. 18, the controller 180 may alternately display the partitioned images of the 2 output images OI in landscape direction on the display regions 211 of the display panel 210 by a unit of 2 partitioned images (i.e., the preset pitch) in order of a $1^{st}$ partitioned image of the $1^{st}$ output image OI1, a $1^{st}$ partitioned image of the $2^{nd}$ output image OI2, a $2^{nd}$ partitioned image of the $1^{st}$ output image OI1, a $2^{nd}$ partitioned image of the $2^{nd}$ output image OI2, . . . , a $10^{th}$ partitioned image of the $1^{st}$ output image OI1 and a $10^{th}$ partitioned image of the $2^{nd}$ output image OI2 from a top display region 211 to a bottom display region 211 of the display panel 210 partitioned into 20×20 display regions 211. Simultaneously, the controller 180 may alternately display the left eye images and the right eye images of the output image OI by a unit of 2 partitioned images (i.e., left eye image and right eye image alternately) in portrait direction on the display regions 211 of the display panel in order of a $1^{st}$ left eye image of the $1^{st}$ output image OI1, a $1^{st}$ right eye image of the $1^{st}$ output image OI1, a $2^{nd}$ left eye image of the $1^{st}$ output image OI1, a $2^{nd}$ right eye image of the $1^{st}$ output image OI1, . . . , a $10^{th}$ left eye image of the $1^{st}$ output image OI1, and a $10^{th}$ right eye image of the $1^{st}$ output image OI1 from a left end display region 211 to a right end display region 211 of the display panel 210 partitioned into 20×20 display regions 211.

Since the 2 output images OI (i.e., 3D images) are displayed on the display panel 210 in the same manner as mentioned in the above description, it can be observed that a view angle δ for each of the output images OI to be perceived by a user varies in accordance with a corresponding one of the $1^{st}$ output image OI1 and the $2^{nd}$ output image OI2.

Thus, a plurality of the partitioned images of each of a plurality of the output images OI are displayed on the display panel 210 partitioned into a plurality of the display regions 211 by the controller 180, whereby a plurality of the output images OI can be simultaneously displayed on the display panel 210 to supply one of the output images OI to a user at a specific view angle θ.

Referring to FIG. 19, a plurality of partitioned images of each of a plurality of output images OI alternately displayed by the controller 180 on a plurality of display regions 211 included in the display panel 210 are refracted at a preset view angle by the multi-view angle panel 220 arranged in front of the display panel 210. If a user moves his face and/or eye to match his view angle θ to the preset view angle θ, the user may be able to watch one of a plurality of the output images OI in accordance with a preset angle. If a user moves his face and/or eye to a position corresponding to another preset view angle, the user may be able to watch another one of a plurality of the output images OI.

For instance, referring to FIG. 19, if a user's view angle θ is matched to a $1^{st}$ preset view angle θ1, the user may be able to watch a $1^{st}$ perceived image P11 (i.e., a $1^{st}$ 3D image) corresponding to a $1^{st}$ output image OI1. And, if a user's view angle θ is matched to a $2^{nd}$ preset view angle θ2, the user may be able to watch a $2^{nd}$ perceived image P12 (i.e., a $2^{nd}$ 3D image) corresponding to a $2^{nd}$ output image OI2.

Preferably, the preset view angle θ may be user-specified to each of a plurality of the output images OI. Preferably, a quantity (i.e., number) of the preset view angles θ may be user-specified.

As mentioned in the above description, the present invention enables a user to switch and watch a 2D image and/or a 3D image on the display unit 200 in a manner of changing the view angle θ only without manipulating an input unit separately. Therefore, the present invention provides a user with convenience and facilitation in switching a screen, thereby enabling the user to watch various images at multiple angles simultaneously.

According to a modified embodiment of the present invention, the display unit 200 of the present invention may have a plurality of 3D images displayed on the display panel 210 but may not include the 3D image supply panel 230.

Instead, according to a $1^{st}$ modified embodiment of the present invention, the mobile terminal may further include polarized glasses that enable a left eye image and a right eye image to be provided to a left eye and a right eye of a user, respectively. A process for supplying a 3D image via the polarized glasses is apparent to those skilled in the art and its details will be omitted for clarity.

According to a $2^{nd}$ modified embodiment of the present invention, the controller 180 displays a left eye image and a right eye image of a 3D image on the display panel 210 alternately in order (i.e., in an interval of a very small time difference in-between) and the mobile terminal may further include shutter glasses including a right eye glass for light cutoff on displaying the left eye image on the display unit 200 and a left eye glass for light cutoff on displaying the right eye image on the display unit 200. A process for supplying a 3D image via the shutter glasses is apparent to those skilled in the art and its details will be omitted for clarity.

According to the $1^{st}$ and $2^{nd}$ modified embodiments of the present invention, using the polarized glasses or the shutter glasses instead of the 3D image supply panel 230, the present invention enables a user to change and watch a plurality of 3D images on the display unit 200 in a manner of changing the view angle θ only without manipulating an input unit separately.

Figure 20A:
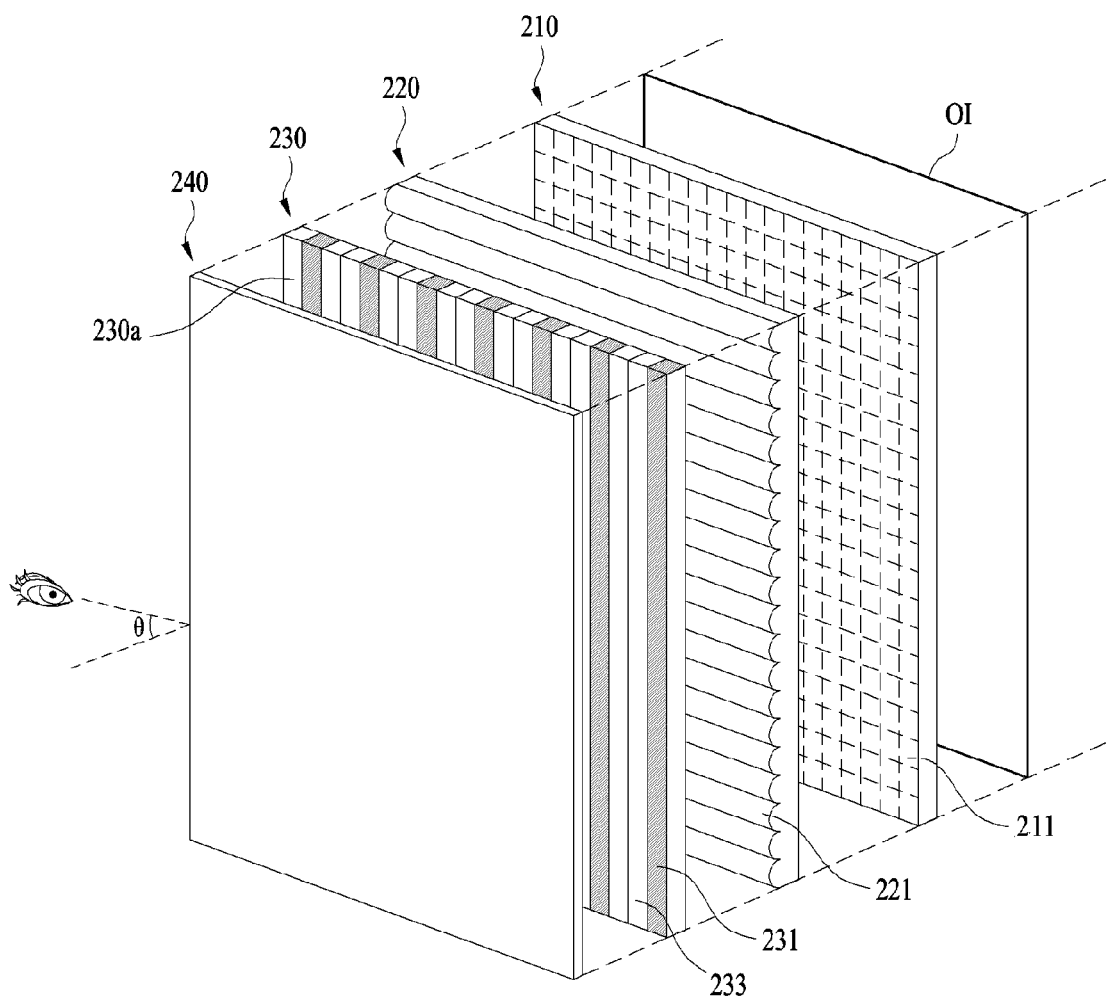
FIG. 20A and FIG. 20B are a schematic exploded perspective diagram and a cross-sectional diagram of a display unit according to a 2$^{nd}$ additional embodiment of the present invention.
Figure 20B:
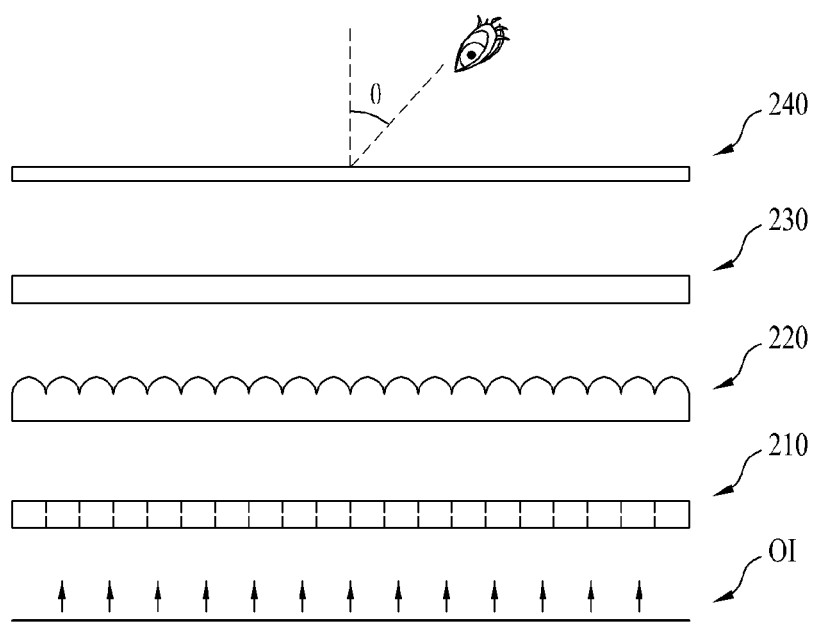

FIG. 20A and FIG. 20B are a schematic exploded perspective diagram and a cross-sectional diagram of a display unit 200 according to a $2^{nd}$ additional embodiment of the present invention. Since the display unit 200 according to the $2^{nd}$ additional embodiment of the present invention may include the same components of the mobile terminal including the aforementioned display unit 200 except that the mobile terminal including the aforementioned display unit 200 further includes a view angle sensing unit and a touch panel 240, the details of the same components shall be omitted if possible.

Referring to FIG. 20A and FIG. 20B, a mobile terminal according to a present embodiment may include a display panel 210 configured to display a plurality of output images OI, a multi-view angle panel 220 provided in front of the display panel 210 to provide a user with one output image OI among a plurality of the output images OI in accordance with a plurality of preset view angles, a view angle sensing unit sensing a user's view angle θ, a touch panel 240 provided in front of the display panel 210 to receive an input signal of the user, and a controller 180 controlling the output images OI, the display panel 210 and the touch panel 240. Moreover, the mobile terminal may further include a 3D image supply panel 230.

The controller 180 may be able to change an input region of the touch panel 240 based on the user's view angle θ sensed by the view angle sensing unit. In particular, the controller 180 determines an input view angle corresponding to the user's view angle θ sensed by the view angle sensing unit among a plurality of the preset view angles and then changes the input region for receiving the user's input signal on the touch panel 240 in accordance with the determined input view angle.

Preferably, the view angle sensing unit may include a gyro sensor or at least one camera 121.

In the following description, an operating process for changing the input region of the touch panel 240 in case of the gyro sensor 143 used as the view angle sensing unit and an operating process for changing the input region of the touch panel 240 in case of the at least one camera 121 used as the view angle sensing unit are explained separately.

Figure 21:
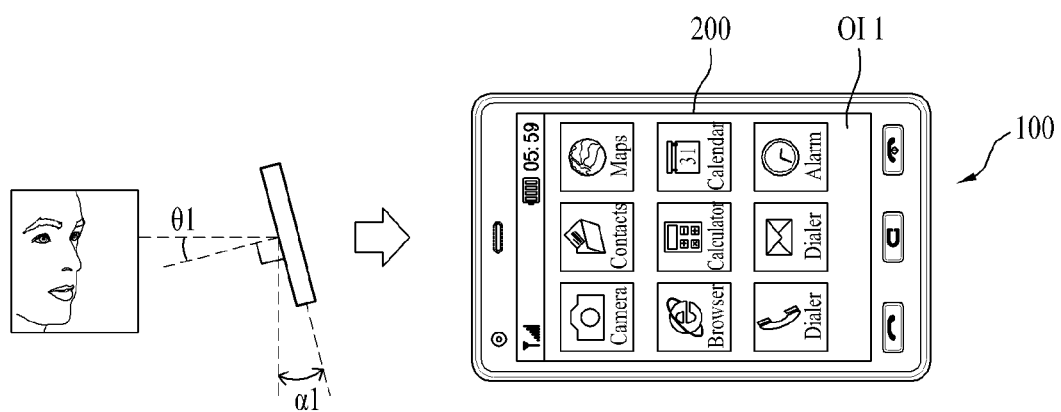
FIG. 21 is a schematic diagram of a screen displayed on the display unit shown in FIG. 20A and FIG. 20B if a gyro sensor is provided.

FIG. 21 is a schematic diagram of a screen displayed on the display unit 200 shown in FIG. 20A and FIG. 20B if the gyro sensor 143 is provided as the view angle sensing unit.

First of all, the gyro sensor 143 measures a user's view angle θ by detecting an inclination of the mobile terminal. In particular, the gyro sensor 143 detects the inclination of the mobile terminal and then the controller 180 calculates an input view angle corresponding to the user's view angle θ based on the mobile terminal's inclination detected by the gyro sensor 143.

In doing so, as mentioned in the foregoing description, one of a plurality of the output images OI is supplied to the user in accordance with the user's view angle θ by the multi-view angle panel 220.

Based on the user's view angle θ sensed by the gyro sensor 143, the controller 180 changes the input region of the touch panel 240 to correspond to one of a plurality of the output images OI provided to the user. Hence, the user may be able to change and watch the output image OI in accordance with his view angle θ and is also able to input various input signals to the mobile terminal via the touch panel 240 having the input region corresponding to the supplied output image OI.

Referring to FIG. 21, if the gyro sensor 143 senses the $1^{st}$ inclination of the mobile terminal α1, the controller 180 calculates $1^{st}$ preset view angle θ1 and controls a touch region so that a plurality of input regions matched to the output image OI corresponding to the $1^{st}$ view angle θ1 can be arranged on the touch panel 240. For instance, referring to FIG. 21, the controller 180 controls the touch panel 240 so that the input regions corresponding to 'camera', 'contacts', 'maps', 'browser', 'calculator', 'calendar', 'dialer' and 'alarm' (e.g., such icons) can be arranged on the touch panel 240.

Figure 22:
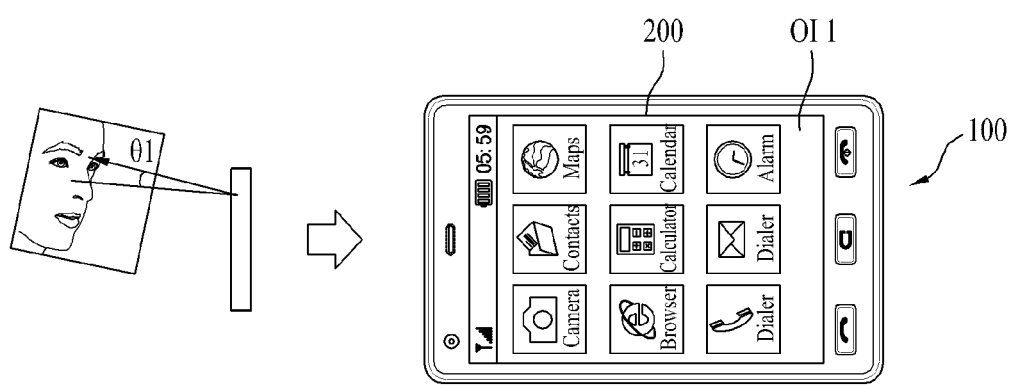
FIG. 22 is a schematic diagram of a screen displayed on the display unit shown in FIG. 20A and FIG. 20B if a camera is provided.

FIG. 22 is a schematic diagram of a screen displayed on the display unit 200 shown in FIG. 20A and FIG. 20B if at least one camera 121 is provided as the view angle sensing unit.

First of all, the at least one camera 121 measures a user's view angle θ by detecting a user's eye. In particular, the at least one camera 121 photographs a user's face and eye and then calculates the user's view angle θ by determining a position of the eye on the user's face based on the user's face and eye taken via the at least one camera 121.

In this case, as mentioned in the foregoing description, a prescribed one of a plurality of the output images OI is supplied to the user by the multi-view angle panel 220 in accordance with the user's view angle θ.

The controller 180 changes an input region of the touch panel 240 to correspond to the prescribed output image OI among a plurality of the output images OI provided to the user based on the user's view angle θ detected by the at least one camera 121. Hence, the user is able to switch and watch an output image OI in accordance with his view angle θ and is also able to input various input signals to the mobile terminal via the touch panel 240 having the input region corresponding to the supplied output image OI.

Referring to FIG. 22, when the user's view angle θ is a $1^{st}$ preset view angle θ1, if the at least one camera 121 senses the $1^{st}$ preset view angle θ1, the controller 180 controls a touch region so that a plurality of input regions matched to the output image OI corresponding to the $1^{st}$ view angle θ1 can be arranged on the touch panel 240. For instance, referring to FIG. 22, the controller 180 controls the touch panel 240 so that the input regions corresponding to 'camera', 'contacts', 'maps', 'browser', 'calculator', 'calendar', 'dialer' and 'alarm' (e.g., such icons) can be arranged on the touch panel 240.

As mentioned in the above description, the present invention enables a user to switch and watch a 2D image and/or a 3D image on the display unit 200 by changing a view angle θ only and also changes an input unit to correspond to the switched 2D image and/or the switched 3D image. Therefore, the present invention may provide a user with convenience for changing a program and/or application executed in the mobile terminal.

Moreover, the controller 180 may be able to change an output audio of the audio output module based on the view angle θ sensed by the view angle sensing unit. In particular, the controller 180 may change an output audio of the audio output module to correspond to one of a plurality of output images OI provided to the user based on the view angle θ sensed by the view angle sensing unit. Hence, the user may switch change and watch an output image OI in accordance with his view angle θ and listen to an output audio corresponding to the supplied output image OI as well.

Figure 23:
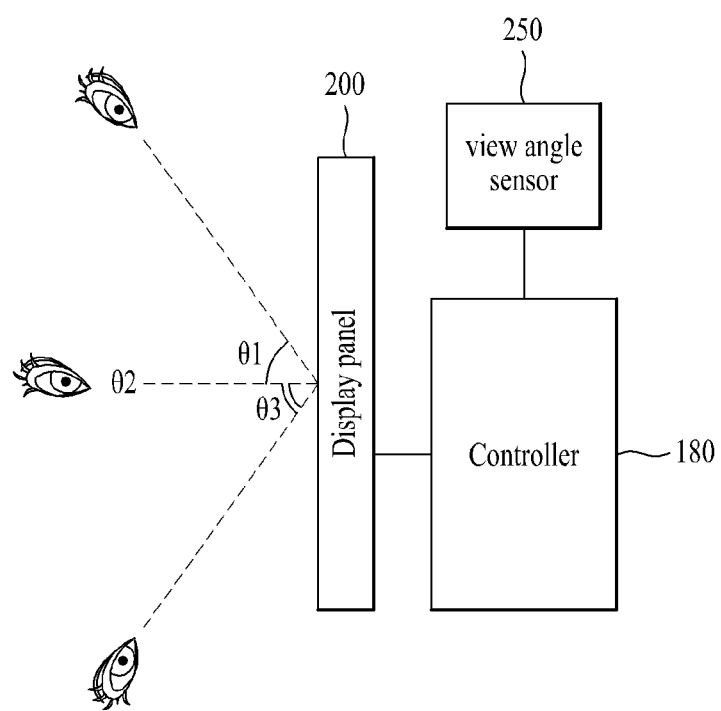
FIG. 23 is a diagram for the concept of a mobile terminal according to a modified embodiment of the present invention.

FIG. 23 is a diagram for the concept of a mobile terminal according to a modified embodiment of the present invention. The mobile terminal according to the present invention may include the aforementioned view angle sensing unit 250 instead of the multi-view angle panel 220. In particular, a mobile terminal according to a modified embodiment of the present invention may include a display panel 210 configured to display an output image OI, a view angle sensing unit 250 configured to sense a user's view angle θ, and a controller 180 controlling the display panel 210 and the output image OI. Moreover, the controller 180 may display an output image OI corresponding to a plurality of preset view angles based on the user's view angle θ sensed by the view angle sensing unit 250 and a plurality of the preset view angles.

In particular, the view angle sensing unit 250 may include a gyro sensor 143 and/or at least one camera 121 configured to photograph a user's eye. In case that the view angle sensing unit 250 includes the at least one camera 121, the controller 180 may determine the user's view angle θ by determining a position of the photographed user's eye.

In this case, the controller 180 determines an input view angle corresponding to the user's view angle θ among a plurality of the preset view angles and then displays the output image OI corresponding to the input view angle.

The mobile terminal may further include a touch panel 240 provided over the display panel 210. In this case, the controller 180 may determine an input view angle θ corresponding to the user's view angle θ among a plurality of the preset view angles and then vary an input region for receiving a user's input signal on the touch panel 240 in accordance with the input view angle. Simultaneously, the controller 180 may change an output audio of the audio output module to correspond to the output image OI in accordance with the user's view angle θ sensed by the view angle sensing unit 250.

Preferably, at least one of the output image OI corresponding to the preset view angle, the input region of the touch panel 240 and the output audio may be user-specified.

Thus, as the view angle sensing unit 250 is included instead of the multi-view angle panel 220, the present invention enables a user to switch and watch a 2D image and/or a 3D image on the display unit 200 by changing a view angle θ (or an inclination of the mobile terminal) only without manipulating the input unit separately. Therefore, the present invention provides a user with convenience of a screen switching, thereby facilitating the user to simultaneously watch various images at multiple angles.

According to one embodiment of the present invention, the above-described methods can be implemented in a program recorded medium as processor-readable codes. The processor-readable media may include all kinds of recording devices in which data readable by a computer system are saved. The processor-readable media may include ROM, RAM, CD-ROM, magnetic tapes, floppy discs, optical data storage devices, and the like for example and also include carrier-wave type implementations (e.g., transmission via Internet).

Accordingly, the present invention provides the following effects and/or advantages.

First of all, the present invention enables a user to switch and watch a 2D image and/or a 3D image on a display unit by changing a view angle θ only without manipulating the input unit separately. Therefore, the present invention provides a user with convenience of a screen switching, thereby facilitating the user to simultaneously watch various images at multiple angles.

Secondly, the present invention enables a user to switch and watch a 2D image and/or a 3D image on a display unit by changing a view angle only and also changes an input unit to correspond to the switched 2D image and/or the switched 3D image. Therefore, the present invention may provide a user with convenience for changing a program and/or application executed in a mobile terminal.

The aforementioned embodiments of the mobile terminal may be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a display panel configured to display a plurality of output images, the plurality of output images comprising a 3D (3-dimensional) image including a plurality of left eye images and a plurality of right eye images;
a multi-view angle panel positioned over the display panel and configured to permit viewing of one of the plurality of output images according to a selected one of a plurality of preset view angles;
a 3D image supply panel positioned over the display panel to provide the left eye image to a left eye and the right eye image to a right eye of the user; and a controller configured to:
- partition the plurality of output images into a plurality of partitioned images in a landscape direction of the plurality of output images;
- partition the display panel into a plurality of grid display regions in the landscape direction to correspond to the plurality of the partitioned images and in a vertical direction to correspond to the plurality of left eye images and the plurality of right eye images;
- control the display panel to display the plurality of partitioned images on the plurality of grid display regions alternately in the vertical direction such that a portion of the plurality of partitioned images is displayed on a corresponding portion of the plurality of grid display regions; and
- control the display panel to display the plurality of left eye images and the plurality of right eye images on the plurality of grid display regions alternately in the landscape direction such that a portion of the plurality of left eye images and a portion of the plurality of right eye images are displayed on corresponding portions of the plurality of grid display regions.

2. The mobile terminal of claim 1, wherein the controller is further configured to cause displaying of the plurality of partitioned images on the plurality of grid display regions alternately and sequentially to display the plurality of partitioned images on the display panel with a preset pitch which corresponds to a number of the plurality of output images.

3. The mobile terminal of claim 1, wherein the multi-view angle panel comprises a first lenticular panel having a plurality of cylindrical lenticules configured to correspond to the plurality of preset view angles.

4. The mobile terminal of claim 3, wherein the plurality of cylindrical lenticules are further configured to correspond to the plurality of preset view angles in a landscape direction for the plurality of output images.

5. The mobile terminal of claim 1, wherein the multi-view angle panel comprises a microlens panel having a plurality of hemispherical microlenses configured to correspond to the plurality of preset view angles.

6. The mobile terminal of claim 1, wherein:
the plurality of output images comprise a first output image and a second output image configured to display a same content; and
the controller is further configured to control the display panel to display the first output image and the second output image such that the second image is upside down image of the first image.

7. The mobile terminal of claim 1, wherein the 3D image supply panel comprises a barrier panel having a plurality of light cutoff parts and a plurality of light-transmitting parts, each one of the plurality of light transmitting parts alternating with each one of the plurality of light cutoff parts.

8. The mobile terminal of claim 7, wherein the barrier panel comprises a transparent organic light emitting diode panel.

9. The mobile terminal of claim 7, wherein:
the barrier panel comprises a plurality of sub pixels; and
a size of each of the plurality of sub pixels is smaller than a size of a unit pixel of the left or right eye image on the display panel.

10. The mobile terminal of claim 7, further comprising polarized glasses configured to provide the left eye image to the left eye and the right eye image to the right eye.

11. The mobile terminal of claim 1, wherein the 3D image supply panel comprises a second lenticular panel having a plurality of cylindrical lenticules formed in a portrait direction for the plurality of output images.

12. The mobile terminal of claim 1, further comprising shutter glasses having:
- a right eye glass for light cutoff while displaying the left eye image on the display panel; and
- a left eye glass for light cutoff while displaying the right eye image on the display panel.

13. The mobile terminal of claim 1, further comprising a view angle sensing unit configured to sense a user's viewing angle.

14. The mobile terminal of claim 13, wherein the view angle sensing unit comprises a gyro sensor or at least one camera.

15. The mobile terminal of claim 14, further comprising a touch panel positioned over the display panel, wherein the controller is further configured to:
- determine an input viewing angle corresponding to the user's viewing angle sensed by the view angle sensing unit among the plurality of preset view angles; and
- change a location of an input region on the touch panel according to the determined input viewing angle such that a user input is receivable at the input region re-located.

* * * * *